US010677921B2

(12) United States Patent
Murphy et al.

(10) Patent No.: US 10,677,921 B2
(45) Date of Patent: Jun. 9, 2020

(54) CASTING GUIDANCE SYSTEMS AND METHODS

(71) Applicant: FLIR Belgium BVBA, Meer (BE)

(72) Inventors: Adam Murphy, Manchester, NH (US); Christopher Daniel Gatland, Fareham (GB); Mark Johnson, Vannes (FR)

(73) Assignee: FLIR Belgium BVBA, Meer (BE)

( * ) Notice: Subject to any disclaimer, the term of this patent is extended or adjusted under 35 U.S.C. 154(b) by 199 days.

(21) Appl. No.: 15/939,738

(22) Filed: Mar. 29, 2018

(65) Prior Publication Data

US 2018/0217257 A1 Aug. 2, 2018

Related U.S. Application Data

(63) Continuation-in-part of application No. 15/893,465, filed on Feb. 9, 2018, and a continuation-in-part of
(Continued)

(51) Int. Cl.
*G01S 15/96* (2006.01)
*G01S 15/89* (2006.01)
(Continued)

(52) U.S. Cl.
CPC ............. *G01S 15/96* (2013.01); *A01K 79/00* (2013.01); *A01K 97/125* (2013.01); *A01K 99/00* (2013.01);
(Continued)

(58) Field of Classification Search
CPC ........ G01S 15/96; G01S 15/86; G01S 7/6281; G01S 7/6272; G01S 15/89; G01S 7/539;
(Continued)

(56) References Cited

U.S. PATENT DOCUMENTS 2,671,206 A 3/1954 Krause
3,989,216 A 11/1976 Veatch
(Continued)

FOREIGN PATENT DOCUMENTS

EP 1148347 10/2001
EP 1804183 7/2007
(Continued)

*Primary Examiner* — Daniel Pihulic
(74) *Attorney, Agent, or Firm* — Haynes and Boone, LLP

(57) ABSTRACT

Techniques are disclosed for systems and methods to provide casting guidance for users of mobile structures, including watercraft. A casting guidance system includes a sonar transducer assembly and a logic device configured to communicate with the sonar transducer assembly. The sonar transducer assembly is adapted to be mounted to a mobile structure and placed in a body of water. The logic device is configured to identify one or more underwater targets in sonar data received from the sonar transducer assembly, determine casting guidance parameters corresponding to the one or more identified underwater targets, and generate at least one casting guidance identifier based, at least in part, on the determined casting guidance parameters. Subsequent user input, the sonar data, and/or the casting guidance parameters may be used to adjust a steering actuator, a propulsion system thrust, and/or other operational systems of the mobile structure.

20 Claims, 24 Drawing Sheets

Related U.S. Application Data application No. PCT/US2018/015315, filed on Jan. 25, 2018, application No. 15/939,738, which is a continuation-in-part of application No. 15/443,836, filed on Feb. 27, 2017, now Pat. No. 10,191,153, said application No. 15/443,836 is a continuation of application No. PCT/US2015/045962, filed on Aug. 19, 2015.

(60) Provisional application No. 62/480,312, filed on Mar. 31, 2017, provisional application No. 62/458,533, filed on Feb. 13, 2017, provisional application No. 62/044,906, filed on Sep. 2, 2014, provisional application No. 62/451,427, filed on Jan. 27, 2017.

(51) Int. Cl.

| | | |
|---|---|---|
| *G01S 15/02* | (2006.01) | |
| *G01S 7/539* | (2006.01) | |
| *A01K 79/00* | (2006.01) | |
| *A01K 97/12* | (2006.01) | |
| *A01K 99/00* | (2006.01) | |
| *G01S 7/62* | (2006.01) | |
| *G01S 15/86* | (2020.01) | |
| *A01K 85/16* | (2006.01) | |

(52) U.S. Cl.
CPC ............ *G01S 7/539* (2013.01); *G01S 7/6272* (2013.01); *G01S 7/6281* (2013.01); *G01S 15/86* (2020.01); *G01S 15/89* (2013.01); *A01K 85/16* (2013.01)

(58) Field of Classification Search
CPC ....... A01K 99/00; A01K 97/125; A01K 79/00; A01K 85/16
See application file for complete search history.

(56) References Cited

U.S. PATENT DOCUMENTS

| | | |
|---|---|---|
| 4,982,924 A | 1/1991 | Havins |
| 5,142,649 A | 8/1992 | O'Donnell |
| 5,530,680 A | 6/1996 | Whitehurst |
| 5,561,641 A | 10/1996 | Nishimori et al. |
| 5,633,710 A | 5/1997 | Kumra et al. |
| 5,675,552 A | 10/1997 | Hicks et al. |
| 5,771,205 A | 6/1998 | Currier et al. |
| 5,887,376 A | 3/1999 | Currier et al. |
| 6,050,945 A | 4/2000 | Peterson et al. |
| 6,806,622 B1 | 10/2004 | Schmidt et al. |
| 7,098,458 B2 | 8/2006 | Kuerbitz et al. |
| 7,542,376 B1 | 6/2009 | Thompson et al. |
| 7,652,952 B2 | 1/2010 | Betts et al. |
| 9,628,592 B2 | 4/2017 | Wu |
| 2002/0159336 A1 | 10/2002 | Brown et al. |
| 2003/0142144 A1* | 7/2003 | Balakrishnan ..... G02B 27/2271 715/848 |
| 2004/0032493 A1 | 2/2004 | Franke et al. |
| 2004/0158147 A1 | 8/2004 | Shifrin |
| 2007/0159489 A1* | 7/2007 | Knepper ............... G06F 11/221 345/520 |
| 2011/0141242 A1 | 6/2011 | Fernandez Alvarez et al. |
| 2012/0014220 A1 | 1/2012 | DePasqua |
| 2013/0192451 A1 | 8/2013 | Scott et al. |
| 2014/0010049 A1 | 1/2014 | Proctor |
| 2017/0090021 A1 | 3/2017 | Sayer et al. |
| 2018/0164434 A1* | 6/2018 | Stokes .................. G01S 7/6218 |
| 2018/0217256 A1* | 8/2018 | Stokes .................... G01S 7/539 |
| 2018/0217257 A1* | 8/2018 | Murphy ................. A01K 79/00 |

FOREIGN PATENT DOCUMENTS

| | | |
|---|---|---|
| EP | 2626721 | 8/2013 |
| JP | 2012/154791 | 8/2012 |
| WO | WO 2010/141011 | 12/2010 |
| WO | WO 2013/063515 | 5/2013 |
| WO | WO 2013/108088 | 7/2013 |
| WO | WO 2015/126678 | 8/2015 |
| WO | WO 2016/073060 | 5/2016 |

\* cited by examiner

CASTING GUIDANCE SYSTEMS AND METHODS

CROSS-REFERENCE TO RELATED APPLICATIONS

This application claims the benefit of and priority to U.S. Provisional Patent Application No. 62/480,312 filed Mar. 31, 2017 and entitled "CASTING GUIDANCE SYSTEMS AND METHODS," which is incorporated herein by reference in its entirety.

This application is a continuation-in-part of U.S. patent application Ser. No. 15/443,836 filed Feb. 27, 2017 and entitled "AUGMENTED REALITY SONAR IMAGERY SYSTEMS AND METHODS," which is a continuation of International Patent Application No. PCT/US2015/045962 filed Aug. 19, 2015 and entitled "AUGMENTED REALITY SONAR IMAGERY SYSTEMS AND METHODS," which claims priority to and the benefit of U.S. Provisional Patent Application No. 62/044,906 filed Sep. 2, 2014 and entitled "AUGMENTED REALITY SONAR IMAGERY SYSTEMS AND METHODS," all of which are incorporated herein by reference in their entirety.

This application is related to U.S. patent application Ser. No. 15/353,579 filed Nov. 16, 2016 and entitled "MULTI-CHANNEL SONAR SYSTEMS AND METHODS," which is a continuation of International Patent Application No. PCT/US2015/032304 filed May 22, 2015 and entitled "MULTICHANNEL SONAR SYSTEMS AND METHODS," which claims priority to and the benefit of U.S. Provisional Patent Application No. 62/005,838 filed May 30, 2014 and entitled "MULTICHANNEL SONAR SYSTEMS AND METHODS," all of which are incorporated herein by reference in their entirety.

This application is a continuation-in-part of International Patent Application No. PCT/US2018/015315 filed Jan. 25, 2018 and entitled "THREE DIMENSIONAL TARGET SELECTION SYSTEMS AND METHODS," which claims priority to and the benefit of U.S. Provisional Patent Application No. 62/451,427 filed Jan. 27, 2017 and entitled "THREE DIMENSIONAL TARGET SELECTION SYSTEMS AND METHODS," all of which are incorporated herein by reference in their entirety.

This application is related to U.S. patent application Ser. No. 15/893,431 filed Feb. 9, 2018 and entitled "3D BOTTOM SURFACE RENDERING SYSTEMS AND METHODS," which claim priority to and the benefit of U.S. Provisional Patent Application No. 62/458,529 filed Feb. 13, 2017 and entitled "3D BOTTOM SURFACE RENDERING SYSTEMS AND METHODS," all of which are incorporated herein by reference in their entirety.

This application is a continuation-in-part of U.S. patent application Ser. No. 15/893,465 filed Feb. 9, 2018 and entitled "3D SCENE ANNOTATION AND ENHANCEMENT SYSTEMS AND METHODS," which claims priority to and the benefit of U.S. Provisional Patent Application No. 62/458,533 filed Feb. 13, 2017 and entitled "3D SCENE ANNOTATION AND ENHANCEMENT SYSTEMS AND METHODS, all of which are incorporated herein by reference in their entirety.

TECHNICAL FIELD

One or more embodiments of the invention relate generally to sonar systems and more particularly, for example, to systems and methods for providing fish casting guidance using sonar data.

BACKGROUND

Sonar may be used to perform bathymetry, detect underwater hazards, find fish, and/or otherwise assist in navigation by producing data and/or imagery of a water column and/or a floor of a body of water beneath a watercraft. Conventional sonar systems often include a display configured to provide traditionally recognizable sonar imagery based on the sonar data to a user.

Sonar imagery is typically provided without reference to any visible feature or features disposed above a waterline of the body of water, and so a user can easily misinterpret relative depths, sizes, and other critical distances reflected in the sonar imagery. In particular, it can be extremely difficult for a user to identify a desirable casting target within the sonar imagery, such as a school of fish or an underwater feature at which fish typically congregate, and then reliably deliver bait (e.g., live bait or a lure) to the desired target. At the same time, consumer market pressures and convenience dictate easier to use systems that include a variety of user-helpful features justifying their cost and maintenance. Thus, there is a need for an improved methodology to provide feature-rich sonar systems, particularly in the context of providing simplified guidance helpful in finding and catching fish.

SUMMARY

Techniques are disclosed for systems and methods to provide casting guidance for users of mobile structures. A casting guidance system may include sonar transducer assemblies and logic devices configured to communicate with the sonar transducer assemblies. Each sonar transducer assembly may be adapted to be mounted to a mobile structure and placed in a body of water. The logic devices may be configured to identify underwater targets in sonar data from the sonar transducer assemblies, to determine casting guidance parameters to the underwater targets, and to generate casting guidance identifiers to show users where and/or how to cast in order to reach identified underwater targets. Subsequent user input, the sonar data, and/or the casting guidance parameters may be used to adjust a steering actuator, a propulsion system thrust, and/or other operational systems of the mobile structure.

In various embodiments, a casting guidance system may include one or more orientation sensors, position sensors, gyroscopes, accelerometers, imaging devices (e.g., such as portable imaging devices, which may include imager position and/or orientation sensors (IPOSs), and/or additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a sonar transducer assembly adapted to be mounted to a mobile structure and placed in a body of water and a logic device configured to communicate with the sonar transducer assembly. The logic device may be configured to identify one or more underwater targets in sonar data received from the sonar transducer assembly, determine casting guidance parameters corresponding to the one or more identified underwater targets, and generate at least one casting guidance identifier based, at least in part, on the determined casting guidance parameters.

In another embodiment, a method may include identifying one or more underwater targets in sonar data received from a sonar transducer assembly adapted to be mounted to a mobile structure and placed in the body of water, determining casting guidance parameters corresponding to the one or more identified underwater targets, and generating at least one casting guidance identifier based, at least in part, on the determined casting guidance parameters.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, casting guidance may be provided by a logic device configured to communicate with a sonar system and/or an imaging device (e.g., and/or various other types of ranging sensor systems) including one or more sonar transducer assemblies, orientation sensors, gyroscopes, accelerometers, position sensors, and/or speed sensors providing measurements of an orientation, a position, an acceleration, and/or a speed of the sonar transducer assemblies, the imaging device, other ranging sensor systems, and/or a coupled mobile structure. For example, the sensors may be mounted to or within the mobile structure (e.g., a watercraft, aircraft, motor vehicle, and/or other mobile structure), or may be integrated with the sonar transducer assemblies, the imaging device, and/or the other ranging sensor systems used to provide casting guidance to a user of the mobile structure. The casting guidance system may be configured to generate various types of casting guidance identifiers, which are used to guide a user in the operation of a casting mechanism to reach a designated casting target, such as a school of fish or an underwater feature at which fish typically congregate.

In accordance with additional and/or supplemental embodiments of the present disclosure, augmented reality sonar imagery may be provided by a portable imaging device and a sonar system including one or more sonar transducer assemblies, orientation sensors, gyroscopes, accelerometers, position sensors, and/or speed sensors providing measurements of an orientation, a position, an acceleration, and/or a speed of the portable imaging device, the sonar transducer assemblies, and/or a coupled mobile structure. For example, the sensors may be mounted to or within the mobile structure (e.g., a watercraft, aircraft, motor vehicle, and/or other mobile structure), or may be integrated with the portable imaging device and/or the sonar transducer assemblies. Embodiments of the present disclosure produce augmented reality sonar imagery that can be referenced to visible objects in the same field of view (FOV), thereby providing sonar imagery that is more intuitive and easier to interpret than sonar data provided by conventional systems and/or methods.

Figure 1A:
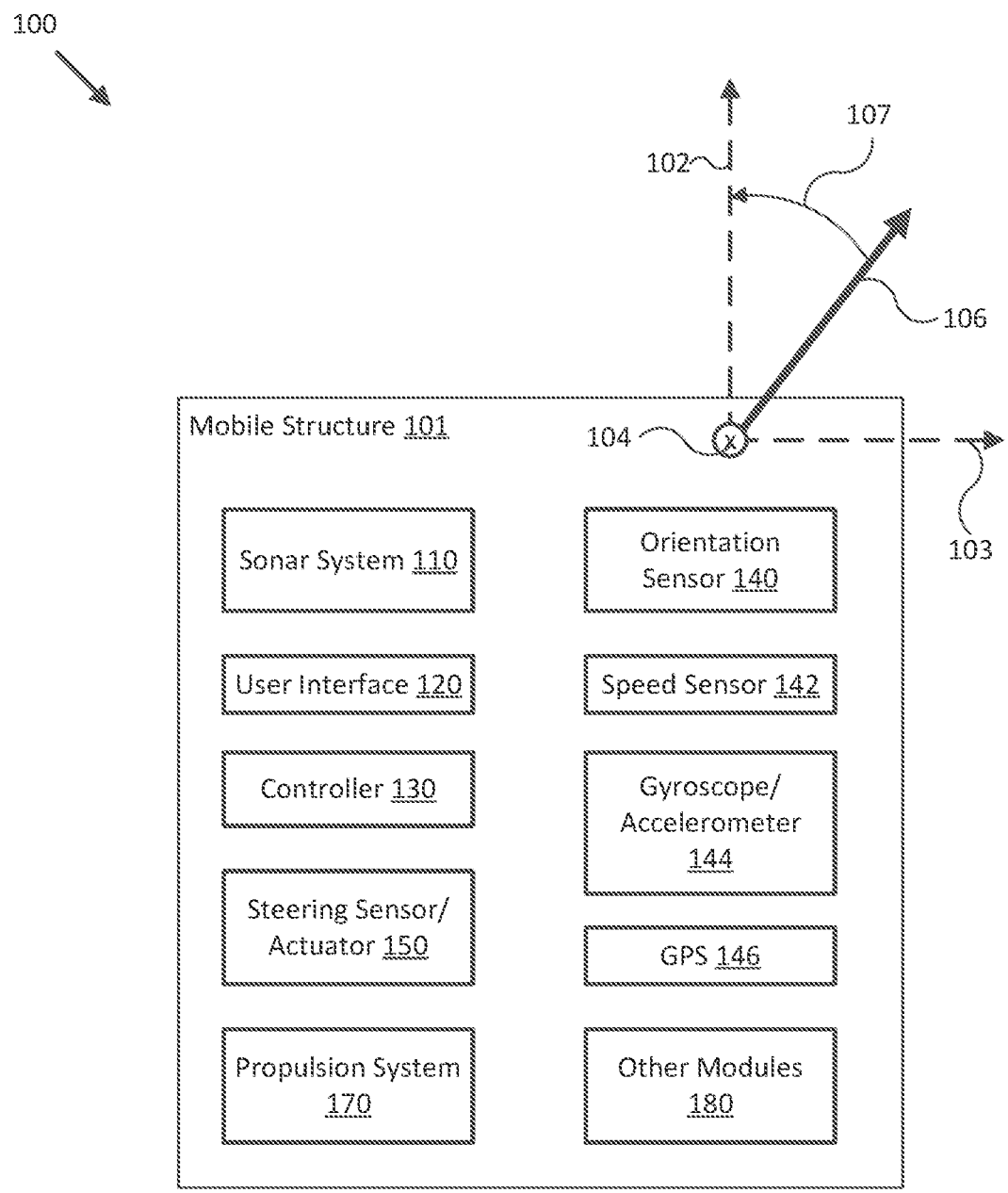
FIG. 1A illustrates a block diagram of an augmented reality sonar imagery and/or casting guidance system in accordance with an embodiment of the disclosure.

FIG. 1A illustrates a block diagram of system 100 in accordance with an embodiment of the disclosure. In various embodiments, system 100 may be adapted to measure an orientation, a position, an acceleration, and/or a speed of mobile structure 101, sonar system 110, and/or user interface 120. System 100 may then use these measurements to form various views of sonar data provided by sonar system 110 and/or to adjust an orientation of sonar system 110 according to a desired operation of sonar system 110 and/or mobile structure 101. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may include an audio sub-system configured to generate audible alerts, tones, and/or other sounds, including speech audio (e.g., text-to-speech audio) as audible feedback and/or indicators of events, sensor data, and/or other data or parameters associated with operation of system 100. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global navigation satellite system (GNSS) receiver, a global positioning satellite receiver, and/or other device capable of determining absolute and/or relative position of mobile structure 101 (e.g., or an element of mobile structure 101, such as sonar system 110 and/or user interface 120) based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices (e.g., including an audio sub-system user interface, such as an audio sub-system used to provide amplified and/or transduced text-to-speech capabilities), automated and/or actuated bait casting and retrieval devices, additional environmental and/or other information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared illuminators, other visible spectrum and non-visible spectrum active illuminators, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
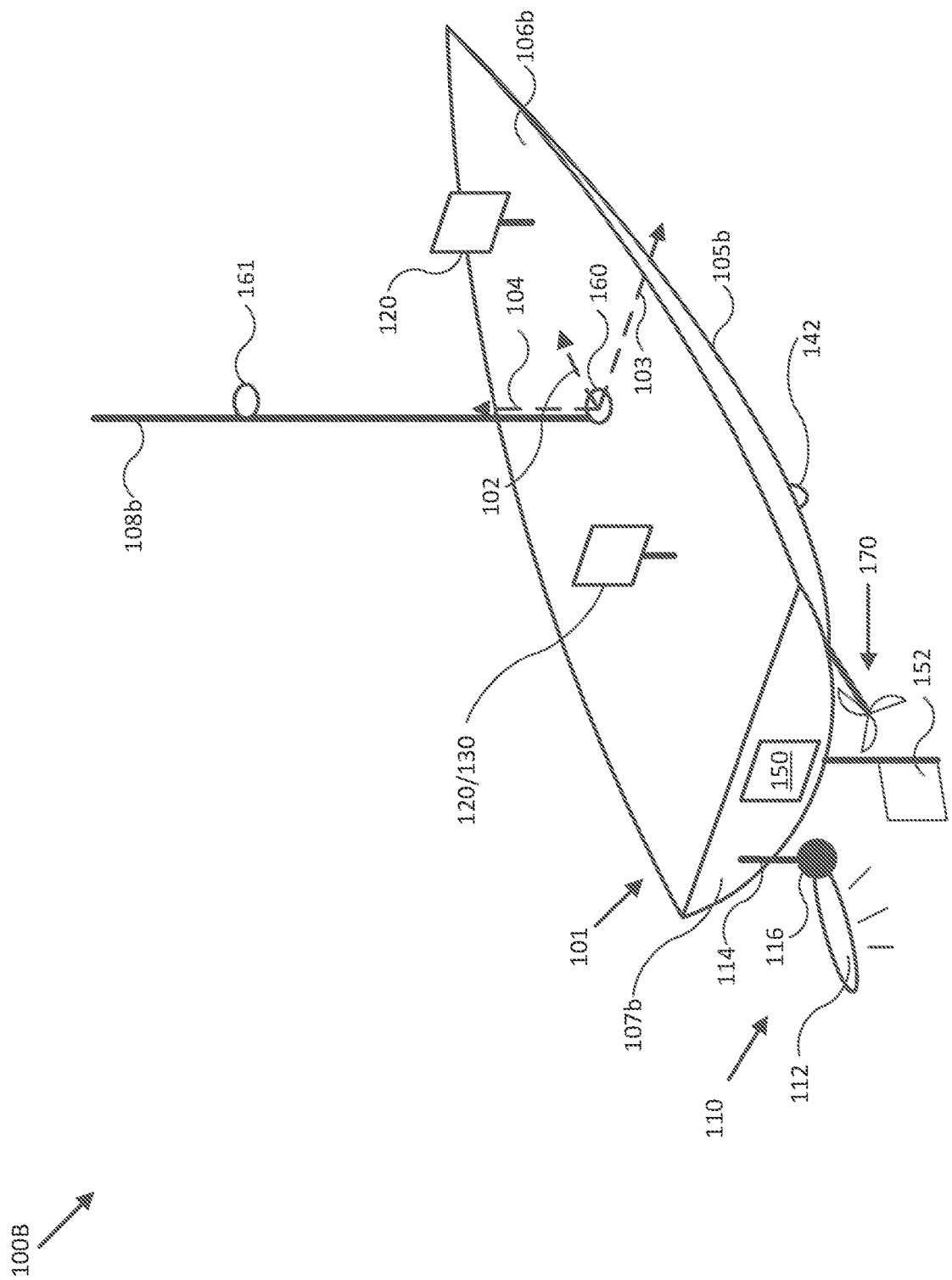
FIG. 1B illustrates a diagram of an augmented reality sonar imagery and/or casting guidance system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GPS 146), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GPS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
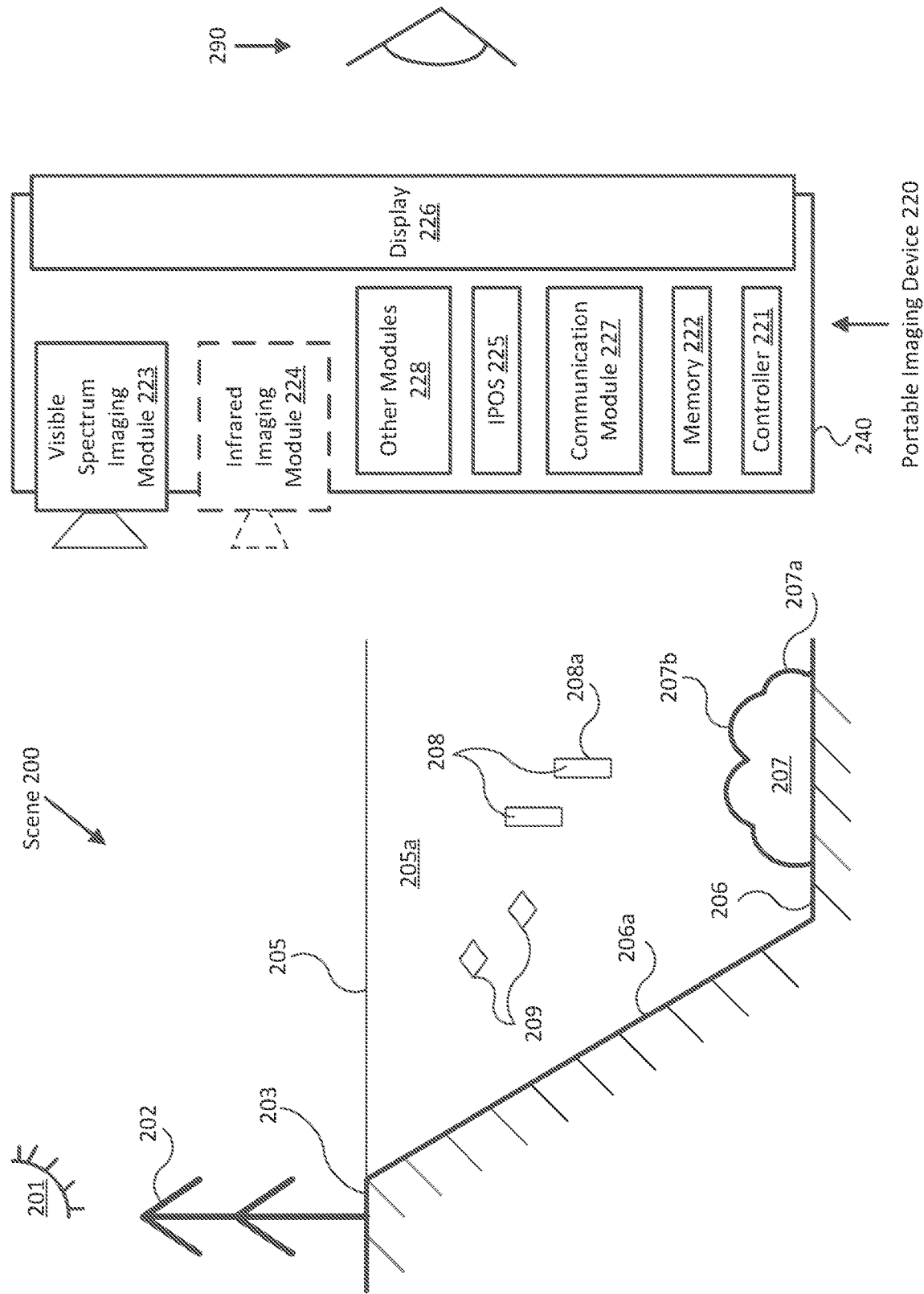
FIG. 2 illustrates a diagram of an augmented reality sonar imagery and/or casting guidance system in accordance with an embodiment of the disclosure.

FIG. 2 illustrates a diagram of an augmented reality casting guidance system including a portable imaging device 220 in accordance with an embodiment of the disclosure. In various embodiments, portable imaging device 220 may be implemented with similar functionality as that described with reference to user interface 120 and/or controller 130 in FIGS. 1A and 1B. In the embodiment shown in FIG. 2, portable imaging device 220 may be configured to provide visible spectrum imagery (e.g., using a visible spectrum imaging module 223), infrared spectrum imagery (using optional infrared imaging module 224), and/or sonar imagery (using sonar system 110 of FIGS. 1A and 1B) of scene 200 to a user 290 using a display 226. For example, portable imaging device 220 may be configured to display rendered image data (e.g., provided by imaging modules 223 and/or 224) in a portion of a field of view (FOV) of display 226 that is above waterline 205 and to display rendered sonar data in a portion of the FOV that is below waterline 205.

Image data provided by imaging modules 223 and/or 224 may include an image of a surface of a body of water 205a and various objects or structures above waterline 205, such as the sun 201, a tree 202, and/or a beach 203. Such image data may be processed using feature/pattern recognition techniques to determine a location of waterline 205 within the image data (e.g., if imaging modules 223 and/or 224 are oriented to capture a portion of scene 200 including waterline 205). Sonar data, which may be provided by bathymetric charts and/or past or current use of sonar system 110 of FIGS. 1A and 1B, may include data representative of waterline 205, a floor 206 of body of water 205a, a bank 206a of floor 206, a bottom feature 207 (e.g., a rock or sunken ship), fish 208, other submerged objects 209 (e.g., trash, seaweed), and/or other underwater features within or surrounding body of water 205a. Such underwater features may be indicated and/or differentiated through use of any combination of contour lines, color and/or greyscale mapping and/or shading, three dimensional rendering, and/or other volumetric rendering techniques. In some embodiments, surface orientations of various underwater features (e.g., of side 207a or top 207b of bottom feature 207, or of side 208a of fish 208) may be detected and/or differentiated using similar sonar data and/or image processing techniques. The portions of either or both the image data and the sonar data that are rendered and displayed by display 226, and the techniques used to render the imagery, may be selected based on the location of waterline 205 relative to an FOV of display 226 to provide augmented reality sonar imagery and/or casting guidance, as described herein.

As shown, portable imaging device 220 may include one or more controllers 221 (e.g., including memory 222), imaging modules (e.g., visible spectrum imaging module 223 and/or infrared imaging module 224), other sensors (e.g., imager position and/or orientation sensor 225), display 226, communication module 227, and/or other modules 228 facilitating operation of portable imaging device 220, which may or may not all be disposed within a common housing 240. In other embodiments, one or more of the modules shown in FIG. 2 may be integrated with a stationary user interface and/or mount (e.g., coupled to deck 106b or mast/sensor mount 108b of mobile structure 101 in FIG. 1B) and be configured to communicate with devices within housing 240 through a distributed embodiment of communication module 227.

Visible spectrum imaging module 223 and infrared imaging module 224 may be electronic devices configured to capture imagery/image data of scene 200 according to their respective spectrums and provide images to controller 221. In some embodiments, visible spectrum imaging module 223 and infrared imaging module 224 may be implemented according to any similar devices described in U.S. patent application Ser. No. 14/138,058, filed Dec. 21, 2013, and entitled "COMPACT MULTI-SPECTRUM IMAGING WITH FUSION", which is hereby incorporated by reference in its entirety. Moreover, imagery provided by imaging modules 223 and 224 may be combined (e.g., blended, overlaid, fused, or otherwise combined) to provide combined (e.g., from multiple source spectrums) imagery/image data that may be rendered by portable imaging device 220 and/or displayed using display 226 using any of the methods described in U.S. patent application Ser. No. 14/138,058 (incorporated by reference above) and/or as further described herein.

More generally, portable imaging device 220 may include a variety of imaging modules adapted to capture imagery (e.g., image and/or video data) according to visible spectrum, infrared, and other spectrums, for example, and provide corresponding image data to controller 221 or other controllers or devices for rendering and/or display. In some embodiments, imaging modules 223 and/or 224 may be mounted to a mobile structure separate from portable imaging device 220 (e.g., to deck 106b or mast/sensor mount 108b of mobile structure 101 in FIG. 1B, using a fixed or actuated mounts such as imager cluster 161) and be configured to provide imagery to controller 221 using wired and/or wireless communications through communication module 227. In such embodiments, multiple portable imaging devices may be configured to share image data provided by imaging modules mounted to the mobile structure.

Controller 221 and/or memory 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile structure 101, for example, similar to controller 130. In some embodiments, controller 221 may be in communication with various modules of portable imaging device 220 and be configured to receive imagery/image data of scene 200 from imaging modules 223 and/or 224, determine waterline 205 of a body of water 205a in scene 200 (e.g., from image data, position data, and/or orientation data provided by the portable imaging device), render or display image data in any portion of an FOV of display 226 that extends above waterline 205, and/or render and/or display sonar data in any portion of the FOV of display 226 that extends below waterline 205.

In some embodiments, controller 221 may be configured to receive the sonar data and/or imagery from controller 130 and/or sonar system 110 of FIGS. 1A or 1B, for example, based on a measured position and/or orientation of portable imaging device 220, either of imaging modules 223 and 224, and/or display 226, provided by imager position and/or orientation sensor (IPOS) 225. Such sonar data and/or imagery may include data from charts, prior ensonifications, and/or current sonar data or imagery provided by, for example, sonar system 110. In further embodiments, controller 221 may be tasked with generating sonar imagery from sonar data, correlating sensor data with sonar data/imagery, communicating operational parameters and/or sensor information with other devices, and/or other operations of systems 100 and/or 100B of FIGS. 1A and 1B. In various embodiments, controller 221 and memory 222 may be integrated together, for example, or may be implemented in a distributed manner across a number of individual controllers and/or memories.

In the embodiment shown in FIG. 2, portable imaging device 220 includes IPOS 225. IPOS 225 may be implemented as one or more orientation sensors, GPS sensors, differential GPS sensors, orientation/position reference transducers and/or optical sensors (e.g., for actuators), visible spectrum and/or infrared imaging modules, and/or other sensors configured to measure a relative and/or absolute orientation and/or position of portable imaging device 220 and/or each of imaging modules 223 and 224 and display 226 and provide such measurements to controller 221. For example, in one embodiment, IPOS 225 may include one or more remote infrared imaging modules (e.g., implemented similar to infrared imaging module 224) fixed to a mobile structure and a number of infrared registration marks disposed on housing 240, and controller 221 may be configured to determine a relative position and/or orientation of portable imaging device 220 from the size and/or position of the infrared registration marks and/or other related characteristics of portable imaging device 220 in image data captured by the one or more remote infrared imaging modules. Such relative position and/or orientation may be relative to a position and/or orientation of the remote infrared imaging modules and/or the mobile structure.

In some embodiments, IPOS 225 may be distributed amongst the various modules of portable imaging device 220 and include one or more individual module IPOSs configured to measure positions and/or orientations of image modules 223 and/or 224 and a separate display IPOS configured to measure a position and/or orientation of display 226. In various embodiments, controller 221 may be configured to combine image data and sonar data according to IPOS measurements and/or measurements of an orientation and/or position of a coupled sonar system (e.g., from a corresponding SPOS) and/or mobile structure to produce combined imagery, such as visible spectrum images of scene 200 above waterline 205 and/or three dimensional sonar images of scene 200 below waterline 205. In other embodiments, controller 221 may be configured to use orientation and/or position measurements of portable imaging device 220, imaging modules 223 and 224, display 226, and/or a mobile structure to control one or more actuators to adjust a position and/or orientation of imaging modules 223 and 224 and/or portions of an associated sonar system (e.g., transducer assembly 112) to image or ensonify a particular position and/or orientation of scene 200 relative to an FOV of display 226.

Display 226 may be implemented as one or more LCDs, OLEDs, touch screen displays, projection devices, and/or other digital displays that may be configured to display image data from imaging modules 223 and 224 and/or sonar data (e.g., from sonar system 110 of FIGS. 1A and 1B) rendered by controller 221 to user 290. In various embodiments, display 226 may be characterized by an FOV that is a function of the available pixel dimensions of display 226, the position and/or orientation of display 226, the FOVs of imaging modules 223 and/or 224, and an effective optical zoom level applied to the image data provided by imaging modules 223 and/or 224. For example, where imaging modules 223 and 224 are within the same housing 240 as display 226, the position and orientation of display 226 may be substantially the same as that of imaging modules 223 and/or 224, and the FOV of display 226 may be the same as that for imaging modules 223 and/or 224 as modified by the effective zoom level and the pixel dimensions of display 226. In other embodiments, where imaging modules 223 and/or 224 are mounted outside of housing 240, the FOV of display 226 may be dependent on the absolute or relative position and/or orientation of display 226 as compared to that of imaging modules 223 and/or 224.

In some embodiments, the effective optical zoom level may be adjusted to produce an FOV for display 226 that substantially reproduces a direct view of scene 200 as experienced by user 290, for example, so that objects within scene 200 are approximately the same size when viewed by user 290 with or without use of portable imaging device 220. In such embodiments, the effective optical zoom level may be adjusted by sensing a distance between user 290 and display 226 and then selecting the effective optical zoom level based on that distance to reproduce the direct view of scene 200. In other embodiments, the effective optical zoom level may be adjusted by user input to reproduce the direct view and/or to select a higher or lower effective optical zoom level to increase or decrease the FOV of and/or the image detail produced by display 226. The effective optical zoom level may be adjusted using digital image processing techniques, manual and/or actuated adjustment of optical components within imaging modules 223 and/or 224, or any combination of image processing or optical adjustments.

Communication module 227 may be implemented as any wired and/or wireless interface configured to communication sensor data, configuration data, parameters, and/or other data and/or signals between portable imaging device 220 and other elements of mobile structure 101 (e.g., as shown in FIGS. 1A and 1B) and/or amongst modules of portable imaging device 220. As described herein, in some embodiments, communication module 227 may be implemented in a distributed manner such that portions of communication module 227 are implemented within one or more modules of portable imaging device 220 that may or may not be disposed within housing 240.

Other modules 228 may include other and/or additional sensors, sensor arrays, actuators, logic devices, communications modules/nodes, power and/or power distribution components, and/or user interface devices (e.g., such as audio sub-systems, as described herein) used to provide additional environmental information and/or configuration parameters, for example, and/or to adjust a position and/or orientation of portable imaging device 220. In some embodiments, other modules 228 may include various environmental sensors providing measurements and/or other sensor signals that can be displayed to a user and/or used by other devices of portable imaging device 220 (e.g., controller 221) to facilitate operation of portable imaging device 220. In some embodiments, other modules 228 may include one or more buttons and/or other user input devices configured to accept manual user input. In other embodiments, other modules may include one or more distance detectors configured to detect user 290 and/or measure or estimate a distance between display 226 and user 290.

In various embodiments, portable imaging device 220 may be implemented in a single housing 240 with a single display (e.g., display 225) adapted to be held by user 290 while user 290 views the display. In other embodiments, housing 240 may be mounted to a mobile structure using a fixed or actuated mount to provide a fixed or actuated view relative to an orientation of the mobile structure. In some embodiments, portable imaging device 220 may be implemented as a wearable device, such as a pair of glasses including a plurality of displays configured to provide the same image to each eye of user 290 individually or to provide stereoscopic imagery to both eyes of user 290. Such stereoscopic imagery may be generated using multiple instances of imaging modules 223 and/or 224, for example, or by applying various image processing techniques to image and/or sonar data to provide a simulation of depth.

Figure 3:
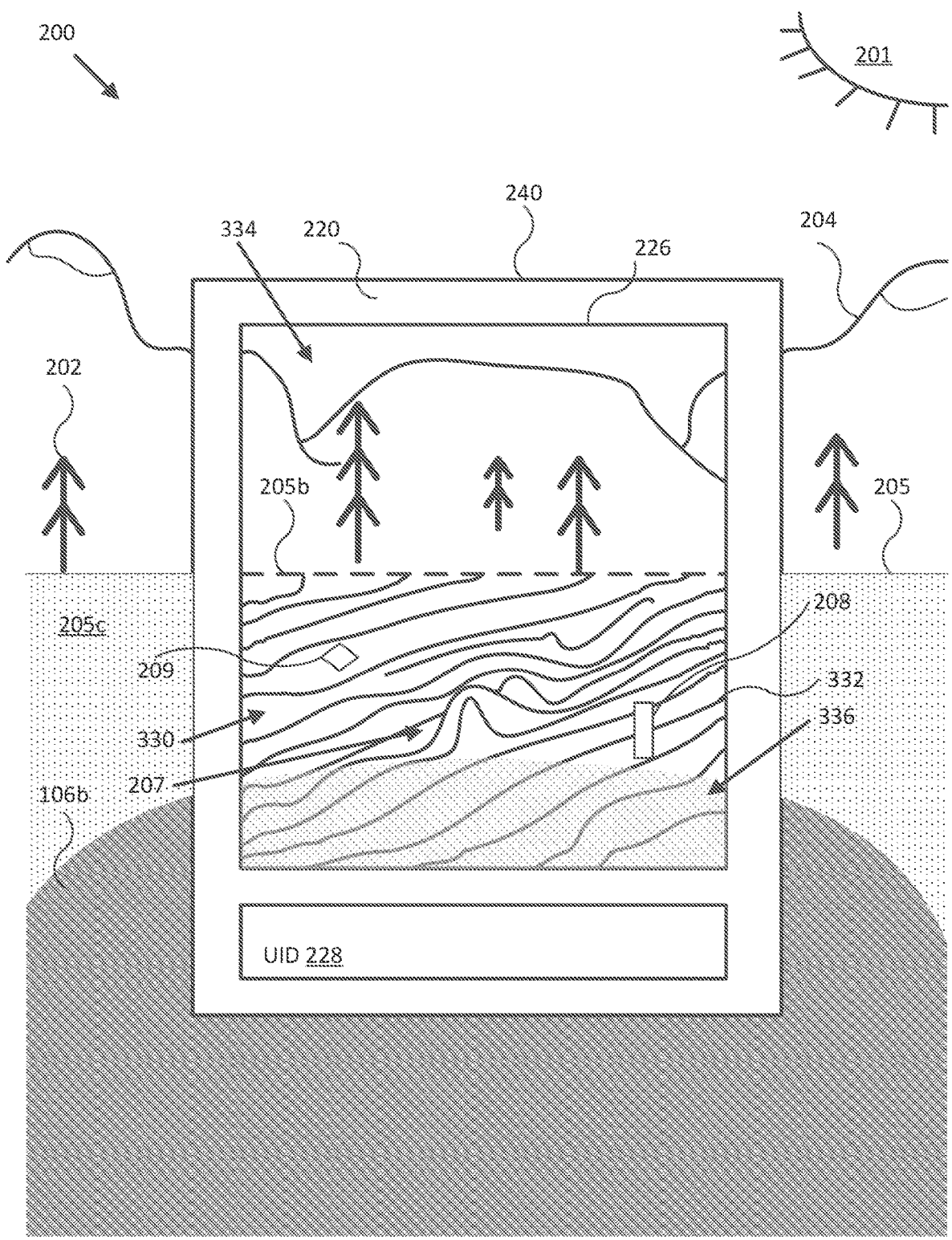
FIG. 3 illustrates a diagram of an augmented reality sonar imagery and/or casting guidance system in accordance with an embodiment of the disclosure.

FIG. 3 illustrates a diagram of an augmented reality casting guidance system including an embodiment of portable imaging device 220 of FIG. 2, in accordance with an embodiment of the disclosure. In the embodiment shown in FIG. 3, portable imaging device 220 is oriented to illustrate imagery displayed by display 226 as viewed by user 290 of FIG. 2, where the effective optical zoom level is adjusted to reproduce a direct view of scene 200 (except for a relatively small portion of the direct view obscured by housing 240 and/or user input device 228.

Scene 200 includes features above waterline 205 illustrated in FIG. 2 and additionally includes mountains/land features 204, surface 205c of body of water 205a, and deck 106b (e.g., of mobile structure/boat 101 in FIG. 1B). Also shown in FIG. 3, and in particular in the FOV of display 226, are detected waterline 205b, portion 330 of the FOV that extends below waterline 205b, and portion 334 of the FOV that extends above waterline 205b. Portable imaging device 220 may in some embodiments be configured to render detected waterline 205b in display 226 to illustrate a detected location of waterline 205 relative to the FOV of display 226. Portion 330 may include imagery representing bottom feature 207, fish 208, and submerged object 209, similar to objects illustrated in FIG. 2. For example, as shown in FIG. 3, portion 330 may include a number of contour lines 332 rendered by a controller (e.g., controller 221 of FIG. 2) to distinguish depths, relative distances, various characteristics of bathymetric data, and/or other characteristics of underwater features. Alternatively, or in addition, portion 330 may include icons and/or other types of graphical indicators configured to illustrate a position and/or distance to fish 208 or submerged object 209, and/or to distinguish between the two (e.g., based on fish detection processing performed on acoustic returns from fish 208 and/or submerged object 209). Although the FOV of display 226 in FIG. 3 is shown to include both portions 330 and 334, a different position and/or orientation of display 226 and/or portable imaging device 220 could result in portion 330 or 334 encompassing the entire FOV of display 226.

In some embodiments, age or source of sonar data may be differentiated by rendering substantially real time sonar data differently from prior-acquired and/or survey map sonar data (e.g., a $3^{rd}$ party provided chart or collection of bathymetric data for a particular body of water stored in memory, such as memory 222 of FIG. 2). For example, substantially real time sonar data may be rendered in color and prior-acquired and/or survey map sonar data may be rendered in greyscale. In some embodiments, a relative age of once real time sonar data may be indicated by reducing a chrominance level of the sonar data as the sonar data ages. In additional embodiments, portable imaging device 220 (e.g., controller 221 of FIG. 2) may be configured to detect or determine various surfaces of underwater features based on acoustic returns from the surfaces and/or one or more volumetric renderings of corresponding sonar data, and the relative or absolute orientations of the various surfaces may be determined from the volumetric renderings. In such embodiments, portable imaging device 220 may be configured to indicate the relative or absolute surface orientations in portion 330 by mapping the surface orientations to a color and/or intensity map and rendering the sonar data corresponding to the determined surfaces in a corresponding color.

Also shown in portion 330 of the FOV of display 226 is overlapping portion 336, which indicates where deck 106b would otherwise obscure direct view of surface 205c. In some embodiments, portable imaging device 220 may be configured to determine whether portion 330 overlaps with a view of a mobile structure disposed on surface 205c (e.g., mobile structure 101 of FIGS. 1A or 1B), thereby forming overlapping portion 336. If overlapping portion 336 exists, portable imaging device 220 may be configured to blend image data of the mobile structure (e.g., captured by imaging modules 223 and/or 224) with sonar data in overlapping portion 336 and rendering the blended data in the overlapping portion 336. In embodiments where portable imaging device 220 is worn by a user and generally occludes direct view of the user's surroundings, the blended imagery can provide a user with a view of sonar data beneath the mobile structure but protect the user from stumbling into objects on the mobile structure and/or walking off deck 106b.

Figure 4:
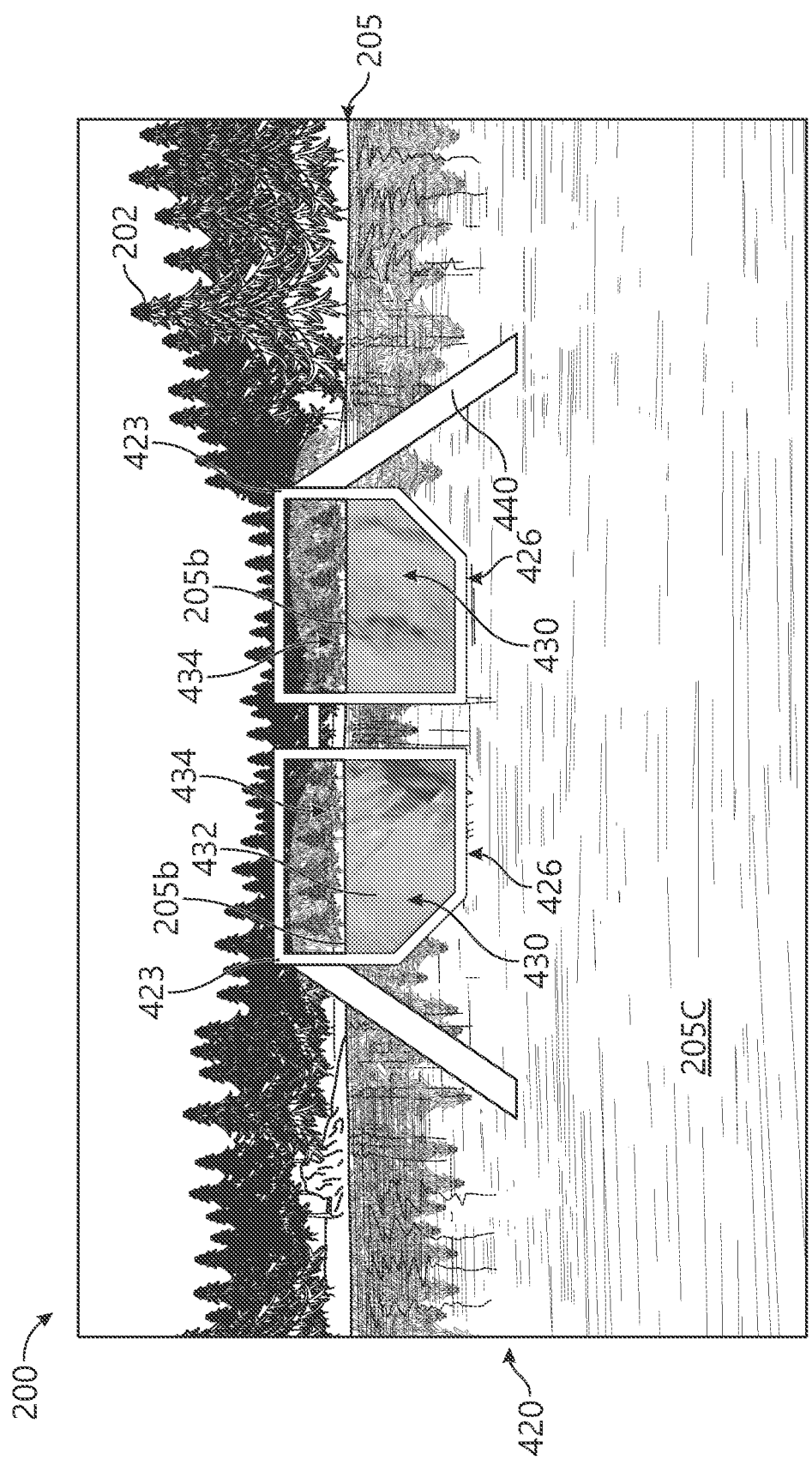
FIG. 4 illustrates a diagram of an augmented reality sonar imagery and/or casting guidance system in accordance with an embodiment of the disclosure.

FIG. 4 illustrates a diagram of an augmented reality casting guidance system including wearable portable imaging device 420 in accordance with an embodiment of the disclosure. In various embodiments, portable imaging device 420 may be implemented with similar functionality as that described with reference to portable imaging device 220 in FIGS. 2 and 3. In the embodiment shown in FIG. 4, wearable portable imaging device 420 is oriented to illustrate imagery displayed by displays 426 (e.g., one per user eye) as viewed by a user wearing portable imaging device 420, where the effective optical zoom level is adjusted to reproduce a direct view of scene 200 (except for a relatively small portion of the direct view obscured by imaging modules 423 and/or frame 440).

FIG. 4 includes some of the features above waterline 205 illustrated in scene 200 of FIGS. 2 and 3, and, in particular in the FOV of displays 426, includes detected waterlines 205b, portions 430 of the FOV that extend below respective waterlines 205b, and portions 434 of the FOV that extend above respective waterlines 205b. Portions 430 may include color and/or intensity shading 432 rendered by a controller (e.g., controller 221 of FIG. 2) to distinguish depths, relative distances, various characteristics of bathymetric data, and/or other characteristics of various underwater features.

As illustrated in FIG. 4, wearable portable imaging device 420 may include one or more imaging modules 423, which may be implemented as visible spectrum and/or infrared imaging modules configured to provide monocular (e.g., copied to both displays 426) and/or stereoscopic image data depending on the number and arrangement of imaging modules and the type of image processing applied to image data provided by imaging modules 423. In addition, an IPOS (e.g., IPOS 225 of FIG. 2) may be integrated with any of imaging modules 423, displays 426, and/or frame 440 and be configured to provide a position and/or orientation of one or more of the features to facilitate determining FOVs for displays 426. In some embodiments, portable imaging device 420 may be configured to determine portion 430 of the FOV of display 426 and use an SPOS and actuator in an associated transducer assembly (e.g., actuator 116 coupled to transducer assembly 112 of sonar system 110 in FIG. 1B) to ensonify at least a subset of portion 430 substantially in real time as a user adjusts a position or orientation of wearable portable imaging device 420 by, for example, moving the user's head. Sonar data provided by the associated transducer assembly may be rendered using position data and/or orientation data provided by the SPOS to correlate the sonar data with portion 430, for example, and/or to facilitate other rendering processing described herein.

In some embodiments, displays 426 may be implemented with substantially transparent display panels, where the only portions of displays 426 that obscure a direct view of scene 200, as seen by a user wearing portable imaging device 420, are those portions actively displaying rendered image data. In such embodiments, portable imaging device 420 may be configured to render and display portions 430 and/or detected waterlines 205b using displays 426 without also rendering portions 434.

Power for portable imaging device 420 may be embedded within frame 440 and/or electrically coupled to portable imaging device 420 through use of a wire harness and/or an external power source, such as a battery pack or a power source for a mobile structure.

Figure 5:
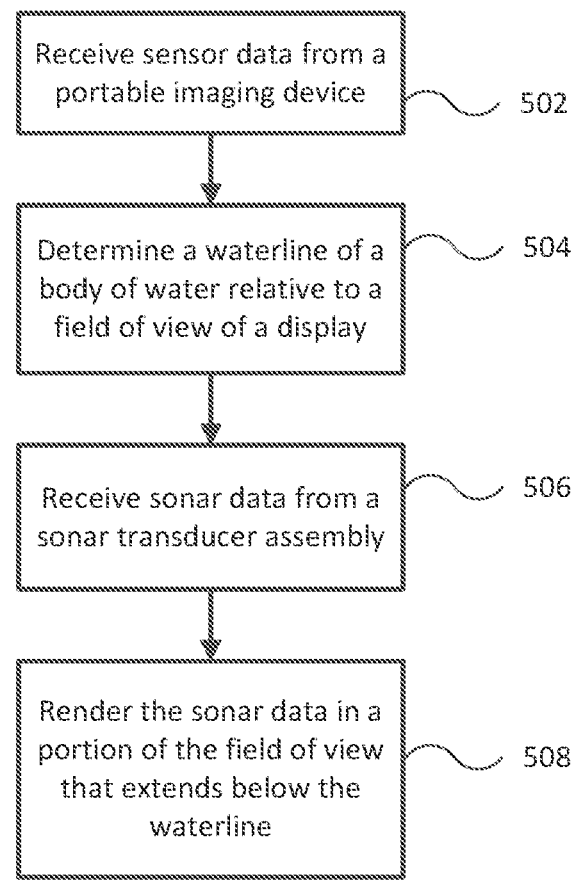
FIG. 5 illustrates a flow diagram of various operations to operate an augmented reality sonar imagery and/or casting guidance system in accordance with an embodiment of the disclosure.

FIG. 5 illustrates a flow diagram of process 500 to provide augmented reality sonar data and/or imagery for mobile structure 101 and/or casting guidance for a user of mobile structure 101 in accordance with embodiments of the disclosure. In some embodiments, the operations of FIG. 5 may be implemented as software instructions executed by one or more logic devices associated with corresponding electronic devices, sensors, and/or structures depicted in FIGS. 1A through 4. More generally, the operations of FIG. 5 may be implemented with any combination of software instructions and/or electronic hardware (e.g., inductors, capacitors, amplifiers, actuators, or other analog and/or digital components).

It should be appreciated that any step, sub-step, sub-process, or block of process 500 may be performed in an order or arrangement different from the embodiments illustrated by FIG. 5. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 500 is described with reference to systems described in reference to FIGS. 1A-4, process 500 may be performed by other systems different from those systems and including a different selection of electronic devices, sensors, assemblies, mobile structures, and/or mobile structure attributes.

Process 500 represents a method for providing augmented reality sonar data and/or imagery and/or casting guidance using systems 100, 100B, 220, and/or 420 in accordance with embodiments of the disclosure. At the initiation of process 500, various system parameters may be populated by prior execution of a process similar to process 500, for example, or may be initialized to zero and/or one or more values corresponding to typical, stored, and/or learned values derived from past operation of process 500, as described herein.

In block 502, a logic device receives sensor data from a portable imaging device. For example, controller 130 of systems 100 or 100B and/or controller 221 of portable imaging device 220 may be configured to receive visible spectrum image data and/or infrared image data from corresponding imaging modules 223 and/or 224, and position and/or orientation data corresponding to imaging modules 223 and/or 224 and/or display 226 of portable imaging device 220 from IPOS 225. In some embodiments, the controller may be configured to receive position and/or orientation data corresponding to display 225 and then use the position and/or orientation data to aim imaging modules 223 and/or 224 (e.g. using control signals provided to actuators coupled to imaging modules 223 and/or 224) so that their FOVs substantially overlap with an FOV and/or relative orientation of display 226.

In block 504, a logic device determines a waterline of a body of water relative to a field of view of a display. For example, controller 130 of systems 100 or 100B and/or controller 221 of portable imaging device 220 may be configured to determine a waterline using the image data, position data, and/or orientation data acquired in block 502. In some embodiments, the controller may be configured to use feature and/or pattern recognition processing to detect a location of waterline 205 within image data provided by imaging modules 223 and/or 224. The controller may then use the various position and/or orientation data, the location of waterline 205 within the image data, various characteristics of display 226, and/or an effective optical zoom level to determine waterline 205b of body of water 205a relative to the FOV of display 226, as described herein.

In block 506, a logic device receives sonar data from a sonar transducer assembly. For example, controller 130 of systems 100 or 100B and/or controller 221 of portable imaging device 220 may be configured to receive sonar data from sonar transducer assembly 112 of sonar system 110. In some embodiments the controller may be configured to transmit position and/or orientation data corresponding to portion 330 of the field of view of display 226 that extends below waterline 205*b*, determined in block 504, to sonar system 110 to aim transducer assembly 112 (e.g., using actuator 116 and/or an associated SPOS) at portion 330 (e.g., or to sweep transducer assembly 112 through portion 330) to acquire substantially real time sonar data corresponding to portion 330. In other embodiments, the controller may be configured to transmit such position and/or orientation data to receive sonar data limited to portion 330, such as from prior-acquired sonar data and/or from a survey map limited by partitioning the sonar data according to corresponding position and/or orientation data, which may be provided by an SPOS when the sonar data was acquired.

In block 508, a logic device renders sonar data in a portion of an FOV that extends below a waterline. For example, controller 130 of systems 100 or 100B and/or controller 221 of portable imaging device 220 may be configured to render sonar data acquired in block 506 in portion 330, as determined in part through operation of blocks 502 and/or 504. In some embodiments, the controller may be configured to render image data provided by imaging modules 223 and/or 224 in portion 334 (e.g., the portion of the FOV of display 226 that extends above waterline 205*b*). In such embodiments, the controller may be configured to generate combined image data from visible spectrum data and infrared image data and render the combined image data in at least a part of portion 334. In other embodiments, the controller may be configured to determine whether portion 330 overlaps with a view of mobile structure 101 (e.g., whether portion 336 exists) and blend (e.g., fuse, alpha blend, or otherwise combine) image data provided by imaging modules 223 and/or 224 with sonar data in overlapping portion 336 when rendering portion 336.

In various embodiments, the controller may be configured to apply various types of image processing to the sonar data when rendering portions 330 and/or 336, such as processing to visually differentiate real time and prior-acquired sonar data, to visually indicate a relative age of different portions of sonar data, to visually indicate surface orientations of underwater features, and/or to provide additional methods to visually differentiate different underwater features and/or different underwater feature characteristics from one another. Similarly, in some embodiments, the controller may be configured to apply various types of image processing to image data when rendering portion 334, such as processing to differentiate above-water objects from one another in low light or otherwise limited visibility environments.

In further embodiments, image data, position data, orientation data, and/or sonar data acquired and/or processed in blocks 502-508 may be used to control operation of mobile structure 101, such as by controlling steering sensor/actuator 150 and/or propulsion system 170 to steer mobile structure 101 according to an orientation of display 226, for example, and/or according to positions and/or depths of floor 206, bottom feature 207, fish 208, and/or submerged objects 209.

It is contemplated that any one or combination of methods to provide augmented reality sonar imagery and/or casting guidance may be performed according to one or more operating contexts of a control loop, for example, such as a startup, learning, running, and/or other type operating context. For example, process 500 may proceed back to block 502 and proceed through process 500 again to produce updated augmented reality sonar imagery and/or casting guidance, as in a control loop.

Embodiments of the present disclosure can thus provide augmented reality sonar imagery and/or casting guidance. Such embodiments may be used to provide sonar imagery and/or casting guidance to assist in navigation for a mobile structure, survey of a body of water, and/or to assist in the operation of other systems, devices, and/or sensors coupled to the mobile structure.

As noted herein, embodiments of the present disclosure provide techniques for casting guidance that can be implemented with minimal required user input and with intuitive user feedback, thereby providing casting guidance that is more accurate and easier to use than conventional systems and/or methods, particularly while operating a mobile structure. For example, a casting guidance system according to embodiments described herein can provide above-water casting guidance for desired fishing targets identified in sonar data from a coupled sonar system. Taking into account a variety of environmental and equipment factors, the system can interpret the ideal casting location, drop time, and retrieval rate to properly present the bait to an identified target. Communicated through a number of mediums, the resulting casting guidance can be provided on the screen of a multifunction display, overlaid onto the water surface using a augmented reality system, projected on the surface of a body of water using an actuated illumination device, or dictated to a user through a text-to-speech system, as described herein.

When fishing, it is often difficult to translate the geographic location of a desired target (fish, structure, etc.) depicted on a sonar screen to the corresponding location above the water. Embodiments of the present disclosure evaluate a local sonar return to provide a recommendation as to where and how a user should present their bait with the greatest chance of catching a specific fish or otherwise reaching a specific underwater target. In all aspects of fishing (e.g., inland, coastal, offshore), anglers want to present their bait at a specific location underwater, such as at a submerged feature where fish are typically located, at a drop-off or area of sharp change in depth, or at a thermocline (i.e., a temperature transition at a specific depth). This underwater target is a combination of surface position and depth below the water. By taking into account the location of target (including its depth), any winds, currents, and sink/retrieval factors of the bait, embodiments disclosed herein can provide an optimum cast position, sink time, and retrieval speed, for example, to ensure the bait is presented as close to the ideal location as possible.

In some embodiments, such casting guidance may be displayed on a screen as a waypoint (e.g., a surface absolute or relative position, such as on a chart), sink time, and/or retrieval rate, can be displayed on a heads-up or augmented reality display that provides the same data as an overlay on an image of the actual water surface, can be projected onto the water surface, and/or can be communicated using an audio sub-system providing an auditory description of the target location (e.g., "Direct your cast to 4 o clock with a distance of 30 feet. Allow to sink for 5 seconds and then begin your retrieval at a reel rate of one rotation per second."), such as for hands-free/vision-free operation.

The following definitions are helpful in describing the disclosed embodiments. Target waypoint=the water surface position corresponding to an identified underwater target. Target depth=the depth at the target waypoint where the user wants to present the bait. Cast position=the surface position where the user should aim to drop the bait. Sink time=the time the user should wait between landing a cast and beginning to retrieve the bait. Slack line=the amount of line (measured in length or time of open bail) that is required to allow the bait to sink to a suitable level prior to beginning a retrieval process. Retrieval rate=the speed (in measured length of line or number of rotations per second) at which the user should reel in their presented bait. Environmental factors=anything that can impact the flight or submersion of a bait (e.g., wind, current, weight, etc.) or the movement of the rod or vessel (e.g., wind, currents, drift, etc.)

In general, a casting guidance system receives one or more of the following input data: underwater target position (e.g., target waypoint and depth, absolute or relative), water current velocity (e.g., direction and/or magnitude/speed), ship position and/or heading (absolute or relative), ship speed over ground (SOG), ship course over ground (COG), wind velocity (e.g., direction and/or magnitude/speed, absolute or relative), and/or other input data, and then determines a cast position where, if the bait were dropped at that position, left to sink for a specified amount of time, and then retrieved at a specified rate, the bait would travel through the water such that it would approach or meet the underwater target position. In some embodiments, the system may also be configured to compensate for various other factors, such as lure type (e.g., jig, crankbait, spinning bait, popper, etc.), lure weight, water temperature, and/or line type (e.g., weight, buoyancy, etc.), as described herein.

In various embodiments, the output of the system may be presented to the user as one or more casting guidance identifiers, such as a target area for casting into (rendered as an icon or graphic on a chart, rendered through an augmented reality heads-up display, projected onto a water surface, or via a spoken set of directions), a suggested length of line to pay out (time to allow the bait to sink), and/or a suggested retrieval rate (how many turns of the reel per second). A cast position may be presented to the user in a variety of ways, such as a point or circular area on an electronic chart or map, a bearing and range from the user's current position, a marker overlaid on the water surface as presented in an augmented reality display (e.g., a heads-up display and/or a visor/glasses), a dictated location the user can understand easily in terms of bearing or heading and range.

Figure 6:
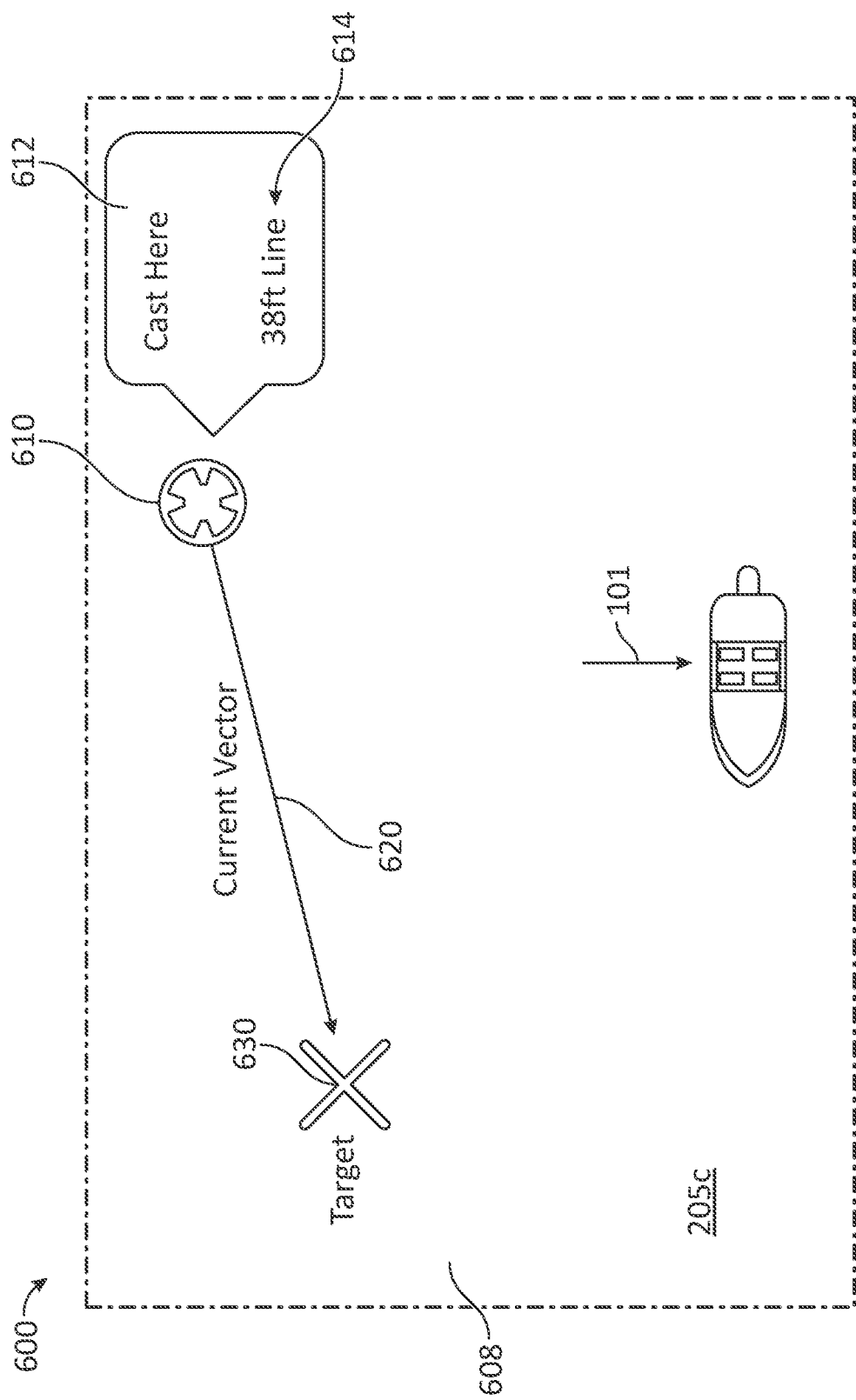
FIGS. 6-8 illustrate display views for a casting guidance system in accordance with embodiments of the disclosure.
Figure 7:
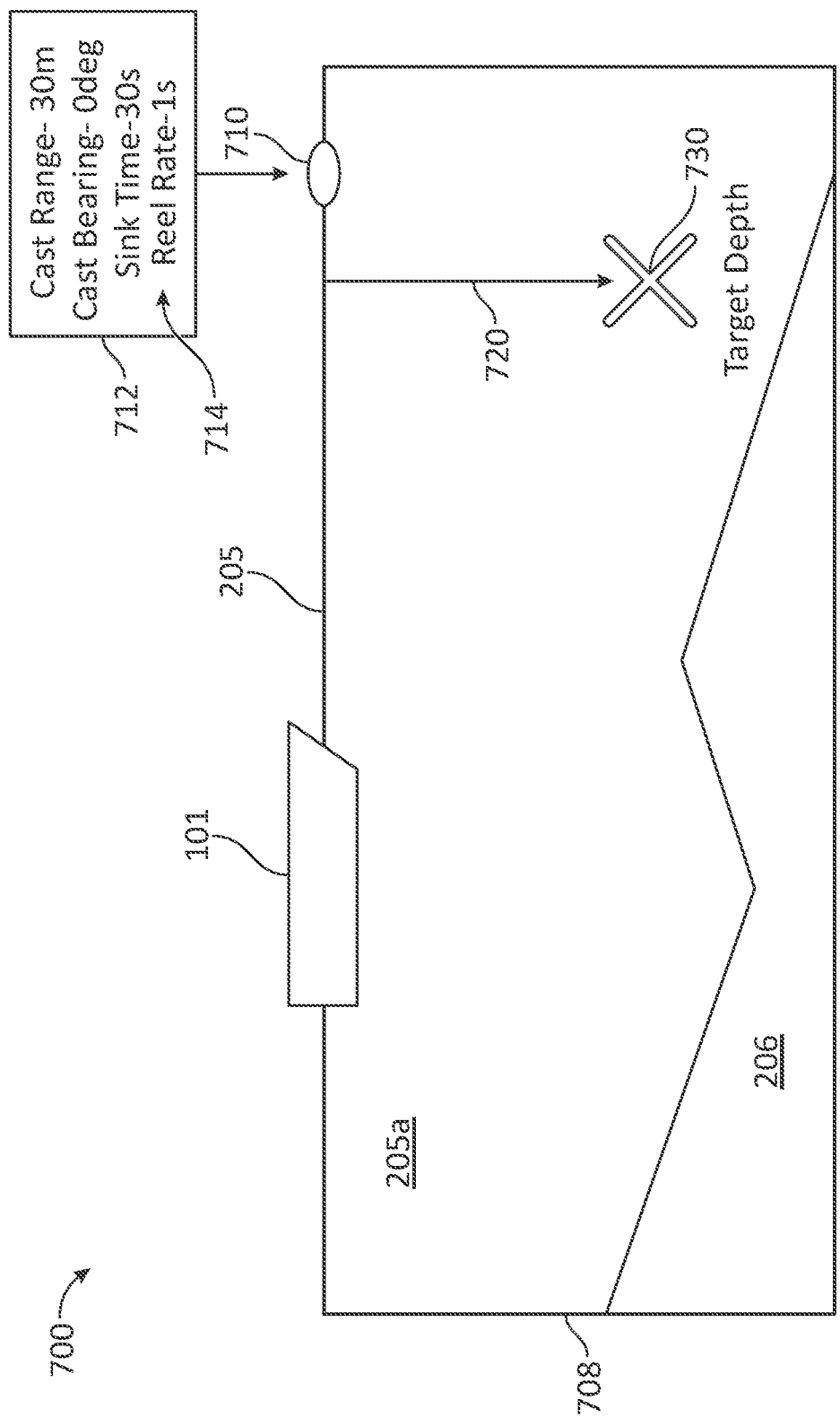
Figure 8:
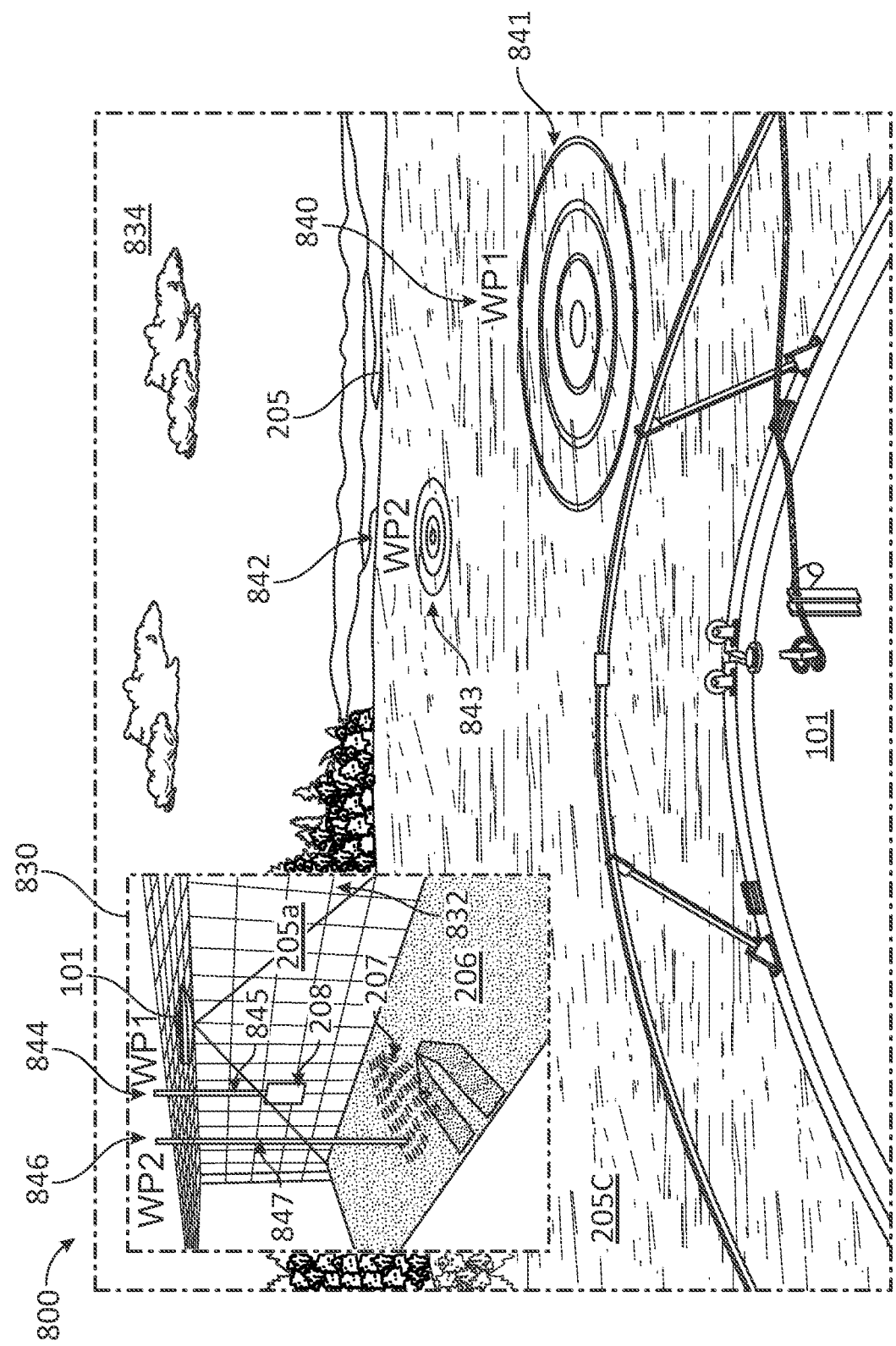

FIGS. 6-8 illustrate display views 600, 700, and 800 for casting guidance as provided by systems/devices 100, 100B, 220, and/or 420 in accordance with embodiments of the disclosure. For example, display view 600 of FIG. 6 shows a surface chart 608 (e.g., an electronic chart or map or satellite image) of a portion of water surface 205c about the current position of mobile structure 101 with a casting guidance identifier including cast position 610, cast detail dialog 612, water current vector 620, and target waypoint 630. As shown in FIG. 6, cast detail dialog 612 may include one or more casting guidance parameters 614, such as sink time, cast bearing or heading, cast range, and/or other casting parameters, as described herein. In various embodiments, display view 600 may be rendered by a display of user interface 120, for example, or display 226 of portable imaging device 220. In some embodiments, casting guidance parameters 614 may be communicated or vocalized by an audio sub-system, as described herein.

Display view 700 of FIG. 7 shows a depth chart 708 (e.g., a horizontal or perspective view of a bathymetric chart or collection of sonar data) rotated or otherwise arranged such that waterline 205, water column/body of water 205a, floor 206, and the current positions of mobile structure 101 and an identified underwater target are in the same field of view of display view 700. As shown in FIG. 7, display view 700 shows a casting guidance identifier including cast position 710, cast detail dialog 712, water current vector 720 (e.g., a sink current caused by the slope of floor 206), and target position 730. In various embodiments, display view 700 may be rendered by a display of user interface 120, for example, or display 226 of portable imaging device 220. In some embodiments, casting guidance parameters 714 may be communicated or vocalized by an audio sub-system, as described herein.

Display view 800 of FIG. 8 shows above-water view 834 of water surface 205c about mobile structure 101 with an inset perspective below-water view 830 of water column 205a and floor 206, both of which include their own casting guidance identifiers (e.g., casting guidance identifiers 840-843 for above-water view 834, and casting guidance identifiers 844-847 for below-water view 830). As shown in display view 800, casting guidance identifiers 840 and 842 are textual cast position ids (e.g., "WP1" and "WP2") corresponding to cast position graphics 841 and 843, all of which are rendered overlying water surface 205c with perspective characteristics (e.g., orthographic shape, size, and/or other perspective characteristics) to help convey their relative ranges from mobile structure 101 and/or how they are positioned on surface 205c.

As presented in FIG. 8, below-water view 830 shows a bathymetric or sonar data perspective view of an area of water column 205a about mobile structure 101 that includes two underwater targets (e.g., school of fish 208 and sunken boat 207) to help provide visual depth context to a user attempting to cast according to casting guidance identifiers 840-843. Below-water view 830 also includes sonar ensonification profile 832 (e.g., to indicate as area within below-water view 830 from which updated sonar data is received) and casting guidance identifiers 844-847 (e.g., textual cast position ids 844 and 846, and target depth plumbs 845 and 847 configured to visually show the corresponding target depths).

In some embodiments, above-water view 834 may be an image captured by an imaging module, such as imaging module 223 and/or 224 of portable image device 220, for example, or imaging modules 423 of wearable portable imaging device 420, and casting guidance identifiers 840-843 may be rendered overlying such image in a corresponding display of a user interface, including in display 226 or displays 426, such as in an augmented display rendering, as described herein. In related embodiments, display view 800 may only include above-water view 834 and omit below-water view 830, for example, or may provide a below-water view similar to below-water view 834 over all portions of above-water view 834 below waterline 205, as described in more detail in conjunction with FIGS. 2-5. In still further embodiments, display view 800, without inset below-water view 830, may correspond to an actual view by a user of mobile structure 101, for example, and casting guidance identifiers (e.g., similar to casting guidance identifiers 840, 841, 842, and/or 843) may be projected onto water surface 205c by an actuated illumination device (e.g., other modules 180).

FIGS. 9-12 illustrate flow diagrams and/or control loops and other operations of respective processes 900, 910, 920, and 930 to provide casting guidance for users (e.g., operators or passengers) of mobile structure 101 in accordance with embodiments of the disclosure. In some embodiments, the operations of FIGS. 9-12 may be implemented as software instructions executed by one or more logic devices associated with corresponding electronic devices and/or sensors of systems/devices 100, 100B, 220, and 420 of FIGS. 1-4. More generally, the operations of FIGS. 9-12 may be implemented with any combination of software instructions and/or electronic hardware (e.g., inductors, capacitors, amplifiers, or other analog and/or digital components).

It should be appreciated that any step, sub-step, sub-process, or block of processes 900, 910, 920, and 930 may be performed in an order or arrangement different from the embodiments illustrated by respective FIGS. 9-12. For example, in other embodiments, one or more blocks and/or elements may be omitted from the various processes, and blocks and/or elements from one process may be included in another process. Furthermore, inputs, outputs, various sensor signals, sensor information, calibration parameters, and/or other operational parameters, constants, state variables or other information may be stored to one or more memories of systems 100, 100B, 220, and/or 420 prior to proceeding to a following portion of a corresponding process. Although processes 900, 910, 920, and 930 are described with reference to systems 100, 100B, 220, and/or 420, processes 900, 910, 920, and 930 may be performed by other systems different from systems 100, 100B, 220, and/or 420, and including a different selection of electronic devices, sensors, mobile structures, and/or mobile structure attributes.

More particularly, FIGS. 9-12 illustrate methods to model the physical process of casting a bait into water and reeling it back to a ship. Such methods may be used iteratively to determine one or more casting guidance parameters to place a given bait at an identified underwater target, as described herein. The modelling generally takes a force->acceleration->velocity->position approach to simulate the underwater trajectory of the bait. As modeled, the bait is initially thrown from an initial position corresponding to the position of mobile structure 101 and directly towards and past the surface position of an identified underwater target. Due to current and sinking trajectory, the bait does not necessarily intersect with the underwater target, so the simulation is re-run with a different cast bearings or headings (e.g., for cross currents), cast ranges, and/or sink times. These iterations are repeated through an appropriate search space (e.g., based on various initial conditions, including ship velocity and various environmental and casting mechanism factors, and results from prior iterations) until the result settles sufficiency close to an intersection with the identified underwater target (e.g., the detected or selected position of an underwater feature or fish).

For example, a first simulation iteration may be set up with an initial sink time of zero, and initial cast bearing equal to the bearing to the identified underwater target, and an initial cast range equal to the distance to the identified underwater target (e.g., as measured at the water surface, or directly to its position), which may be modified by a set minimum drop proximity configured to space the cast drop into the water sufficiently far from directly above a fish so as not to cause it to swim away. At the end of the simulation, angular and linear offsets for the next iteration may be determined based on the closest approach position as determined by the simulation. For example, the next cast bearing may be set equal to the difference between the last cast bearing and a percentage of the determined angular offset (e.g., typically at or between 70 and 90%, or at 80%, which may be adjusted to facilitate convergence towards a global minimum error between the simulated closest approach and the position of the identified underwater target). Likewise, the next sink time may be set equal to the difference between the last sink time and a percentage of the determined linear offset, and the next cast range may be set equal to the difference between the last cast range and a percentage of the determined linear offset. The iterations may be ended upon performing a preset maximum number of iterations, upon the closest approach position being within a preset range of the position of the identified underwater target, or upon reaching one or more other halt conditions.

In some embodiments, all three parameters may be varied between iterations. In other embodiments, only the cast bearing and one of the cast range or sink time may be varied between iterations. For example, in one related embodiment, the sing rate may be varied between iterations only when the simulated bait has a bill area of approximately zero, thereby indicating a sink bait, and the cast range may be varied between iterations only when the simulated bait has a non-zero bill area, thereby indicating a non-sink bait. In various embodiments, the iterative cast ranges, sink times, and cast bearings may be rounded to values reasonably achievable by the caster (e.g., tenths of a meter in cast range, ones or tenths of a second in sink times, and individual degrees in cast bearings).

Figure 9:
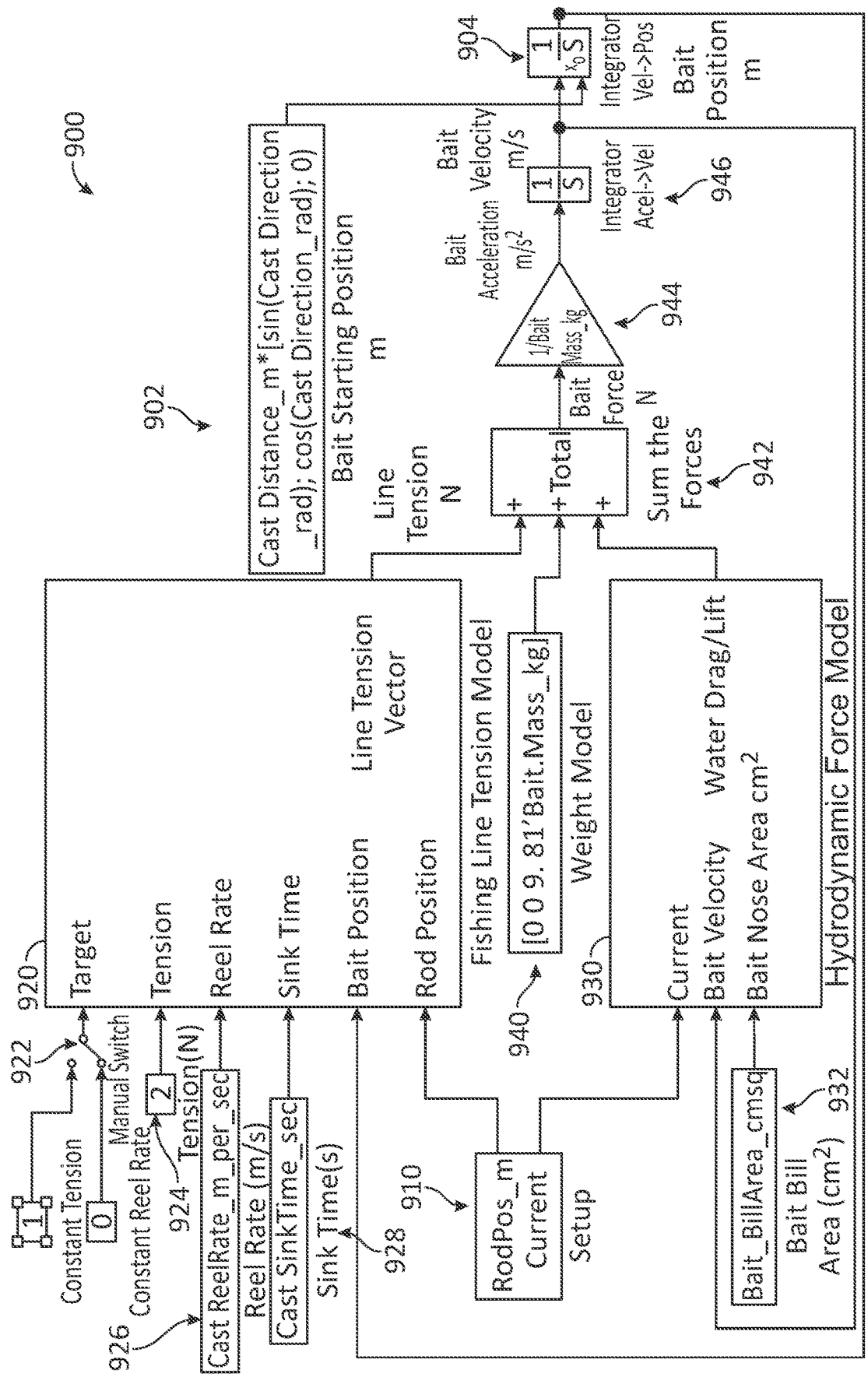
FIGS. 9-12 illustrate flow diagrams of various control loops and other operations to provide casting guidance in accordance with embodiments of the disclosure.

Process 900 of FIG. 9 illustrates an embodiment of a top level view of a process to provide casting guidance. In some embodiments, process 900 may be iterated through a search space of cast bearings or headings, cast ranges, and/or sink times to provide a bait position within a specified distance of an identified underwater target. In general, process 900 begins with the rod/mobile structure 101 at the origin (e.g., x=y=z=0; z=0 at the surface of the water) and the bait already casted to a bait starting position supplied by block 902. Process 900 then proceeds (e.g., according to various initial conditions including the bait starting position) to iteratively update the position of the bait by updating the position of the rod (e.g., as caused by a drift of mobile structure 101 and/or a water current), determining the various forces acting on the bait (e.g., line tension, water drag and/or lift, and gravity/buoyancy), and then determining the updated bait position based on the sum of the forces acting on the bait, until process 900 reaches a stop condition (e.g., when the bait reaches the rod, for example, or is within a specified distance to the rod). Although generally described in the context of casting synthetic bait, process 900 may be adapted to simulate live bait according to statistical characteristics of such live bait.

Figure 11:
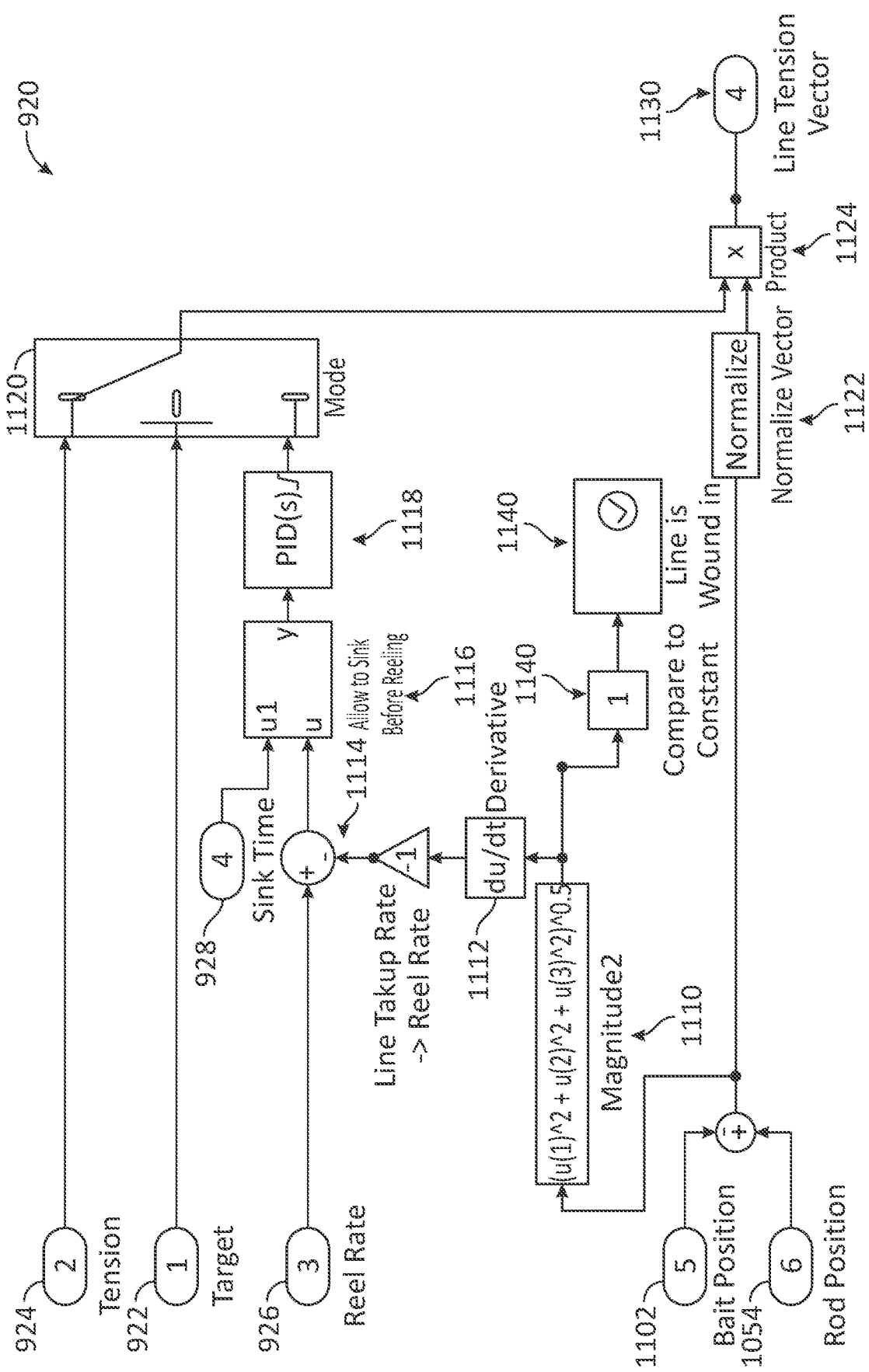
Figure 12:
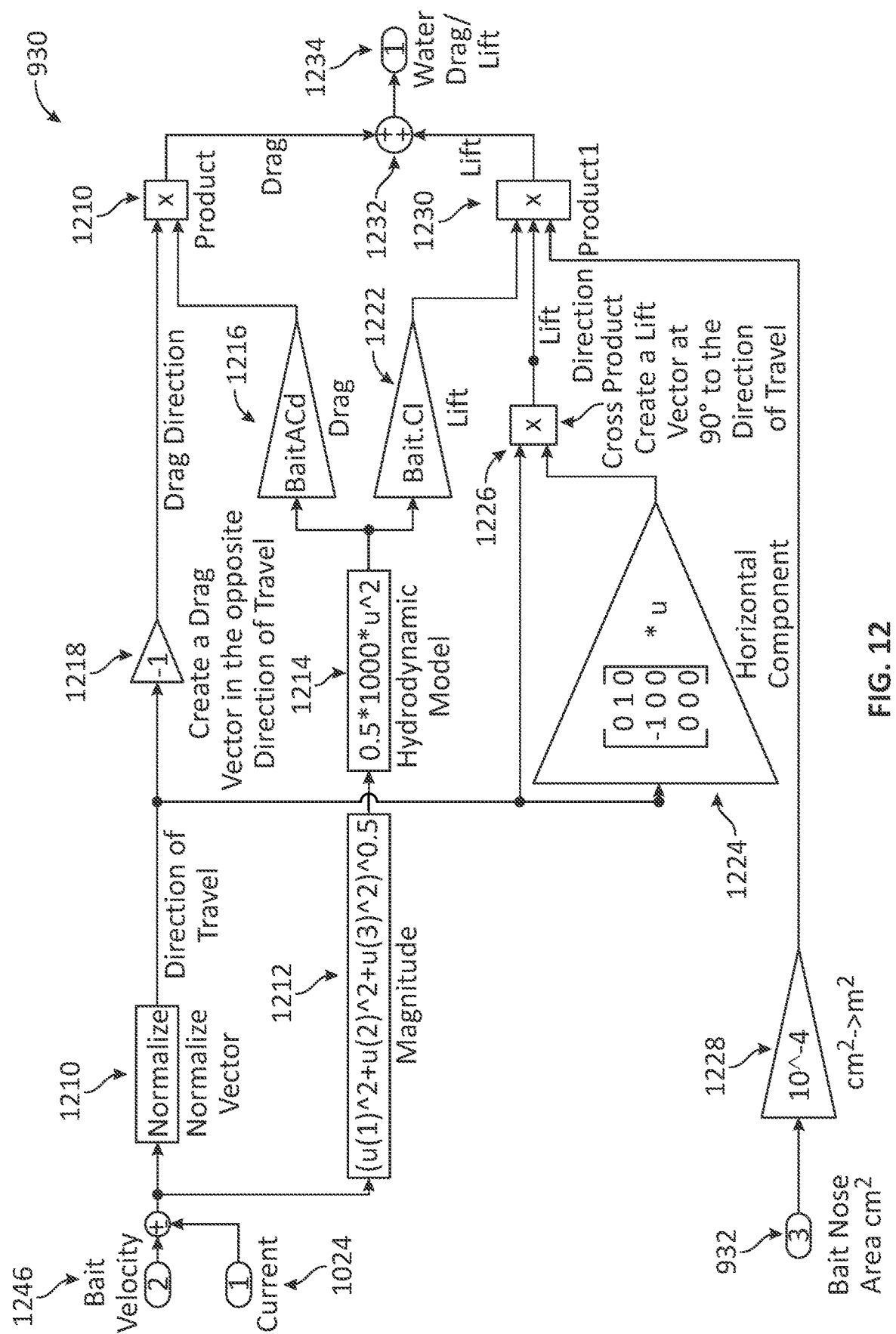

As shown in FIG. 9, process 900 includes setup block 910 (e.g., expanded upon in FIG. 10) providing a rod position (e.g., a position of mobile structure 101) to fishing line tension model block 920 (e.g., expanded upon in FIG. 11) and a water current velocity to hydrodynamic force model block 930 (e.g., expanded upon in FIG. 12). Fishing line tension model block 920 receives the rod position from setup block 910, the bait position from bait position integrator block 904, and one or more additional casting characteristics (e.g., constant tension model or constant retrieval rate model according to manual switch 922, tension 924 (e.g., for a constant tension model), cast retrieval rate 926, and sink time 928) and provides a line tension (e.g., a force vector corresponding to the force from the fishing line acting on the bait as it travels through water) to force sum block 942. Hydrodynamic force model block 930 receives the water current velocity from setup block 910, a bait velocity from bait velocity integrator block 946, and, optionally, a bait bill area from block 932, and provides a water effect force (e.g., a water drag and/or lift force vector on the bait) to force sum block 942.

Force sum block 942 receives the line tension from block 920, the water effect force from block 930, and a bait weight force (e.g., which may include a buoyancy effect depending on the material of the bait) from block 940, combines the various forces acting on the bait, and provides the combined bait force to block 944. Block 944 receives the combined bait force from block 942 and provides a corresponding bait acceleration (e.g., by dividing the combined bait force by the mass of the bait) to bait velocity integrator block 946, which integrates the received bait acceleration and provides the resulting bait velocity to hydrodynamic force model block 930 and bait position integrator block 904. Bait position integrator block 904 updates the position of the bait (as initiated at the bait starting position provided by block 902) and provides the bait position to fishing line tension model block 920.

Figure 10:
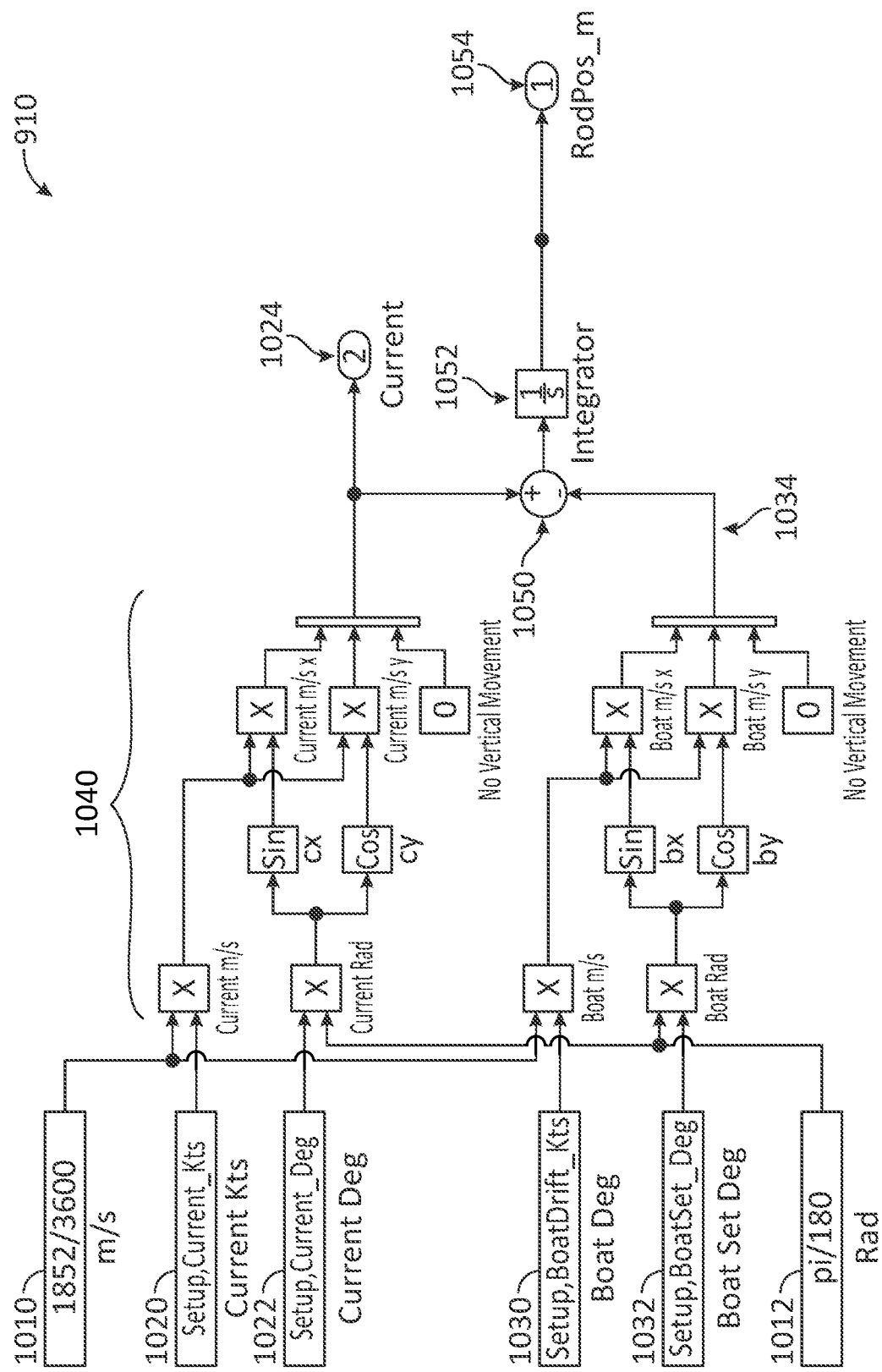

Process 910 of FIG. 10 illustrates an embodiment of setup block 910. In general, process 910 may be configured to determine the water current acting on the bait and/or the rod platform (e.g., mobile structure 101) and to provide the water current acting on the bait and the current position of the rod/mobile structure 101. For example, in some embodiments, process 910 may include one or more conversion constants 1010 and 1012, water current speed 1020 and direction 1022, and mobile structure 101 drift speed 1030 and direction 1032, which may be provided as initial conditions, for example, and processed according to block 1040 to provide a water current velocity at block 1024 and a mobile structure/rod velocity at line 1034. At block 1050, the water current velocity and mobile structure/rod velocities are combined and delivered to block 1052, which integrates them to provide an updated mobile structure/rod position at block 1054. In alternative embodiments, the water current speed and direction may be provided in the form of a vector field, for example, where the water current velocity at the bait (e.g., as provided by block 1024) is different than the water current velocity at the mobile structure/rod (e.g., as combined at block 1050), and process 910 may be configured to provide the bait-specific water current velocity at block 1024 and the rod-specific water current velocity-adjusted rod position at block 1054.

Process 920 of FIG. 11 illustrates an embodiment of fishing line tension model block 920. In general, process 920 may be configured to determine the force acting on the bait due to the fishing line pulling it through the water, depending on a selected mode (e.g., constant line tension or constant retrieval rate). For example, when selector 922 indicates a constant line tension mode, block 1120 passes line tension magnitude 924 to block 1124. Rod position 1054 and bait position 1102 are combined and the vector difference (e.g., the distance between the rod and the bait) is provided to block 1122, which provides a normalized line tension vector (e.g., the vector along the path between the bait and the rod, in the direction towards the rod) to block 1124. Block 1124 then combines the normalized line tension vector and the line tension magnitude and provides the resulting line tension at block 1130.

When selector 922 indicates a retrieval rate mode, block 1120 passes the output of block 1118. In the embodiment shown in FIG. 11, block 1110 may determine the magnitude of the distance between the rod and the bait and provide the difference to block 1112 and blocks 1140. Blocks 1140 compare the distance between the rod and the bait to a set value and end the process (and process 900) when the distance is less than the set value. Block 1112 determines a rate of change of the distance between the rod and the bait, and that rate is combined with the constant retrieval rate provided by block 926 at block 1114. Blocks 1116 and 1118 are configured to set the line tension magnitude to zero during the sink time provided by block 928 and then to convert the difference between the constant retrieval rate and the rate of change in the distance between the bait and the rod into a line tension magnitude (e.g., by converting the resulting effective line velocity into a line acceleration), and block 1120 passes that line tension magnitude to block 1124. Block 1124 then combines the normalized line tension vector and the line tension magnitude and provides the resulting line tension at block 1130.

Process 930 of FIG. 12 illustrates an embodiment of hydrodynamic force model block 930. In general, process 930 may be configured to determine the force acting on the bait due to its speed relative to the water that surrounds it, including any water currents. For example, in some embodiments, process 930 may be configured to combine water current velocity 1024 with bait velocity 1246 and provide the combined velocity to blocks 1210 and 1212. Block 1210 provides a normalized combined velocity vector to blocks 1218, 1224, and 1226, and block 1212 provides a magnitude of the combined velocity to block 1214. Block 1218 generates a normalized drag force vector and provides it to block 1220. Block 1214 converts the magnitude of the combined velocity into a hydrodynamic force factor and provides the hydrodynamic force factor to blocks 1216 and 1222, which convert the hydrodynamic force factor into a drag force magnitude and a lift force magnitude, respectively.

Block 1220 combines the normalized drag force vector and the drag force magnitude into a drag force vector. Block 1228 received a bait nose area from block 932 and converts it into a lift force adjustment that is provided to block 1230. Blocks 1224 and 1226 convert the normalized combined velocity vector into a normalized lift force direction and provide it to block 1230. Block 1230 combines the lift force magnitude, the normalized lift force direction, and the loft force adjustment into a lift force vector. Block 1232 combines the drag and lift force vectors and provides the resulting water effect force at block 1234. In some embodiments, process 930 may be configured to additionally include a buoyancy force (e.g., acting on the bait and/or the line attached to the bait) and add it to the drag and lift force vectors at block 1232.

Although processes 900, 910, 920, and 930 are described in the context of forward evolution in time and multiple iterations with different initial conditions to search and find optimum or sufficient casting guidance parameters, it should be understood that in other embodiments, such processes may be configured to start with the bait at the approximate desired position at or near an underwater target, for example, and to iterate backwards in time to reach an optimum or sufficient casting position and/or other casting guidance parameters. Other physical simulations, using similar or additional casting mechanism characteristics, bait characteristics, environmental sensor data and/or effects, mobile structure characteristics, and/or other data or parameters, are contemplated and may be used to determine various casting guidance parameters, as described herein.

Figure 13A:
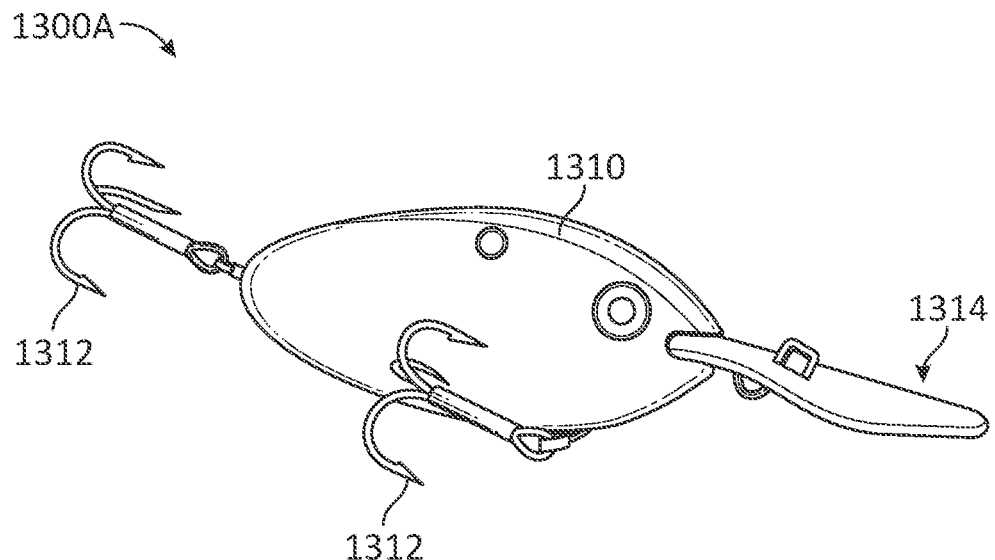
FIGS. 13A-B illustrate diagrams of synthetic bait used to provide casting guidance in accordance with embodiments of the disclosure.
Figure 13B:
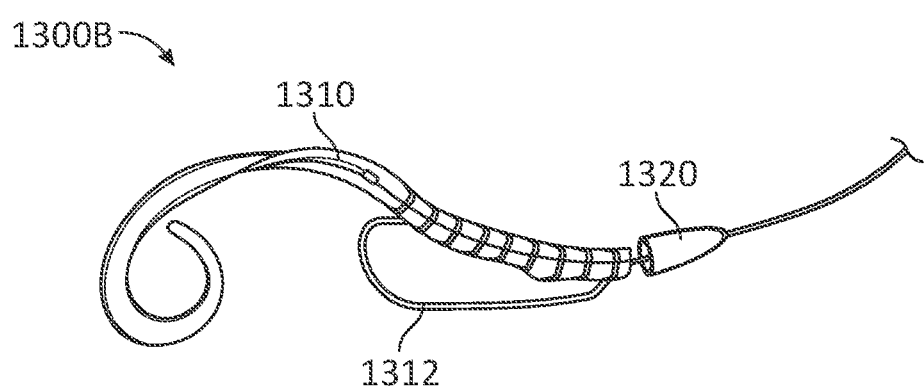

FIGS. 13A-B illustrate diagrams of synthetic bait used to provide casting guidance in accordance with embodiments of the disclosure. For example, FIG. 13A shows synthetic bait 1300A (e.g., a deep diving crank bait) including rigid plastic body 1310, relatively large nose bill 1314, and multiple metal hooks 1312, and FIG. 13B shows synthetic bait 1300B (e.g., a Texas-rigged soft bait) including flexible silicon body 1310, single hook 1312, and nose weight 1320. Each of synthetic baits 1300A-B may be modeled, and corresponding casts simulated, using embodiments of process 900 in FIG. 9.

Figure 14:
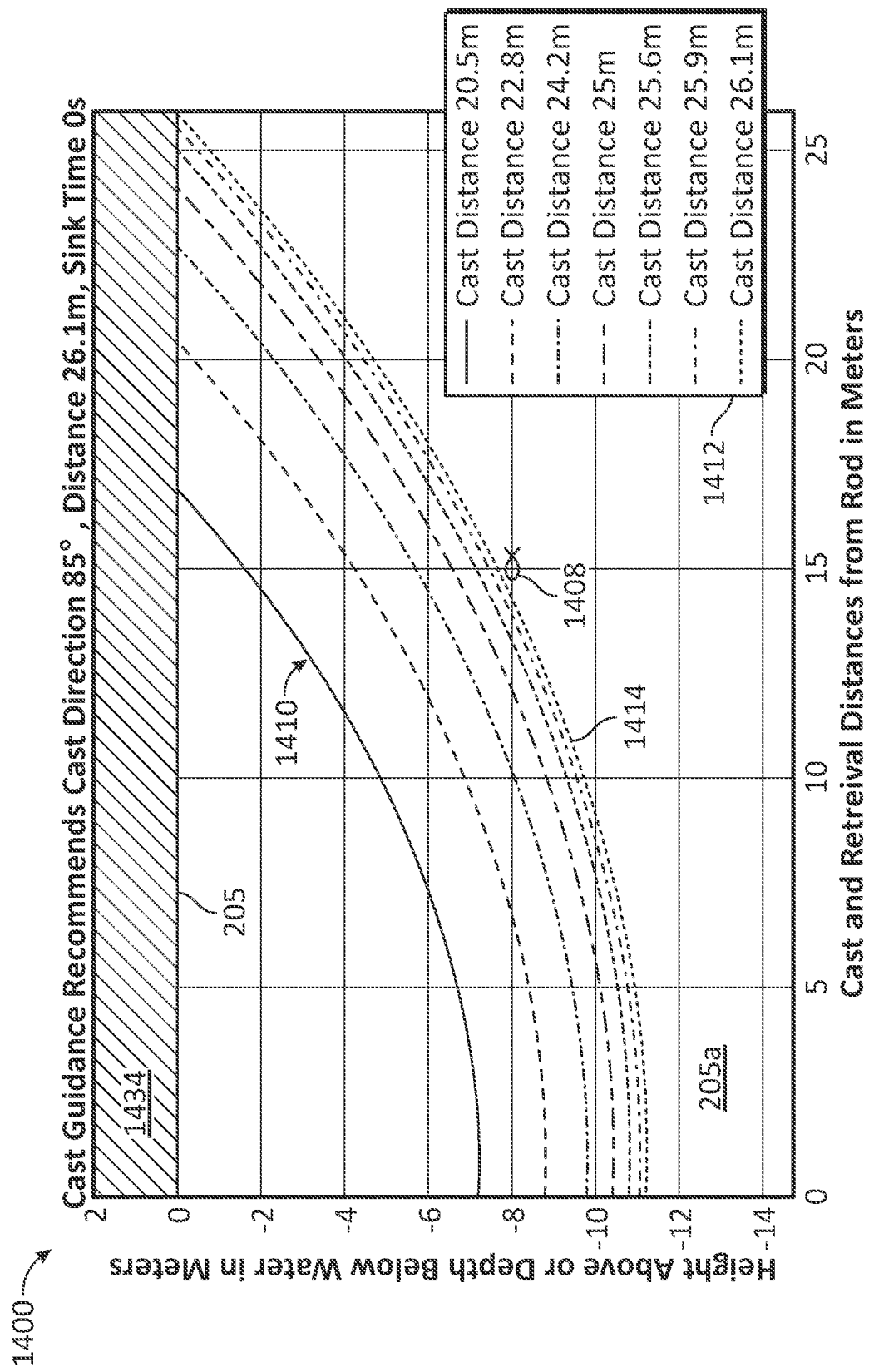
FIGS. 14-16 illustrate graphs of modeled casts, of the synthetic bait of FIG. 13A, used to provide casting guidance in accordance with embodiments of the disclosure.
Figure 15:
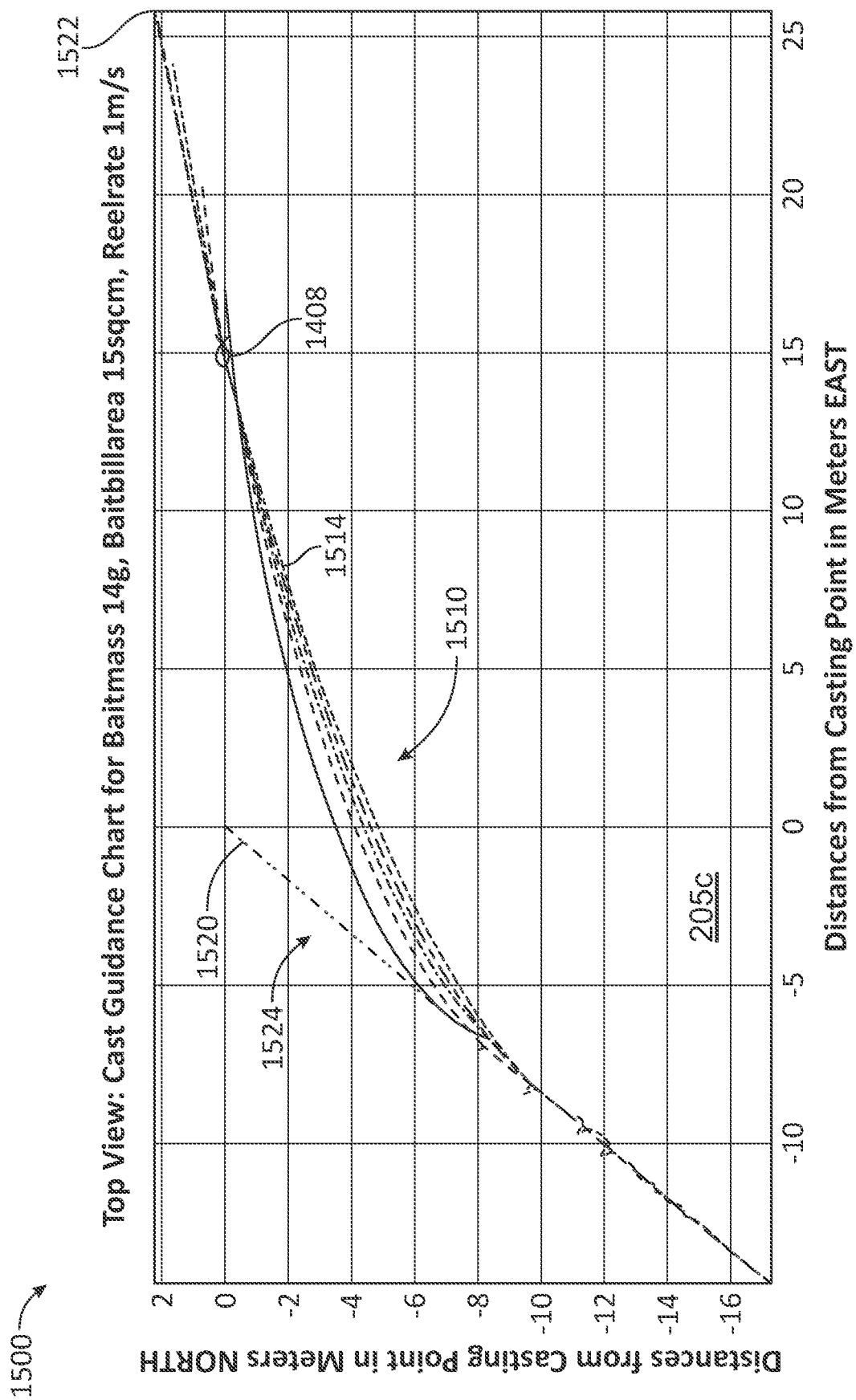
Figure 16:
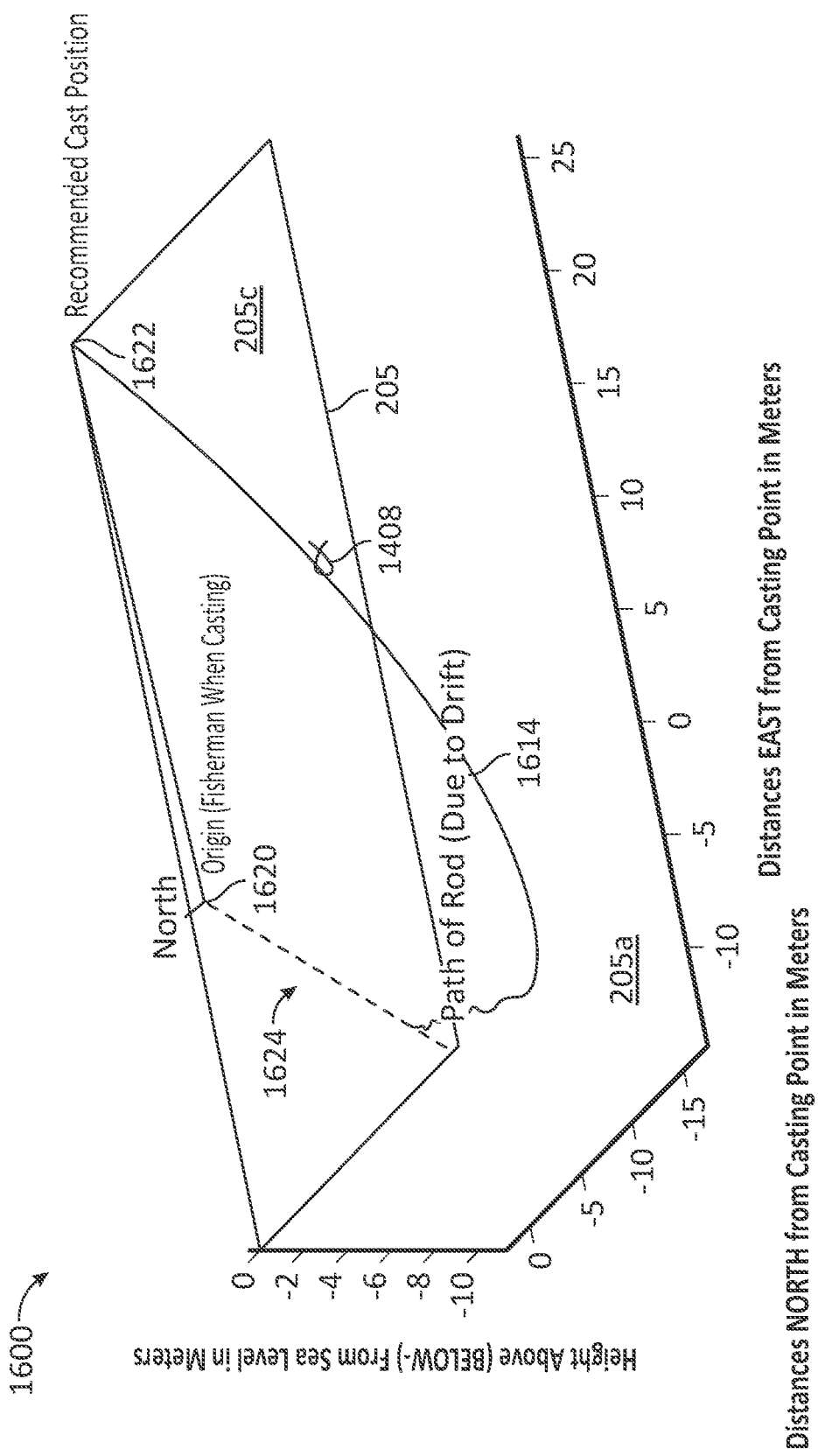

For example, FIGS. 14-16 illustrate graphs of modeled casts, of synthetic bait 1300A of FIG. 13A, used to provide casting guidance in accordance with embodiments of the disclosure. In particular, parameters for synthetic bait 1300A used in process 900 may include the following: Bait.BillArea_cmsq=15; Bait.Mass_g=14; Bait.Mass_kg=Bait.Mass_g/1000; Bait.ACd=0.02^2*1.4; BaitCl=0.5; Setup.FishPos_m=[150−8]; Setup.BoatDrift_Kts=1; Setup.BoatSet_Deg=210; Setup.Current_Kts=0.5; Setup.Current_Deg=240; Setup.RodHeight_m=0.5 (e.g., despite the weight, ~0.5 ounces/14 grams, this type of lure typically floats, and crank baits are to be retrieved with the rod tip down); Setup.MinimumDropProximity_m=2 (e.g., minimum distance to the fish while sinking/reeling in); Cast.ReelRate_m_per_sec=1. Any of such casting guidance parameters and/or suggested operating techniques may be conveyed to a user through a casting guidance indicator, as described herein.

FIG. 14 shows graph 1400 of bait retrieval path as a function of cast range (e.g., as set forth in legend 1412), using synthetic bait 1300A and modeled using an embodiment of process 900 and the parameters set forth above. As shown in FIG. 14, graph 1400 includes underwater target 1408 at a depth of 8 meters and range of 15 meters from the starting position of mobile structure 101, which is at the origin of graph 1400. Line 205 represents the waterline between above-the-water portion 1434 and water column 205a. Also shown are casting simulations 1410, including the recommended casting simulation 1414 with a cast range of 26.1 m, cast bearing of 85 degrees, and a sink time of 0 s.

FIG. 15 shows graph 1500 of bait retrieval path as a function of cast range (e.g., as set forth in legend 1412), using synthetic bait 1300A and modeled using an embodiment of process 900 and the parameters set forth above. As shown in FIG. 15, graph 1500 is a top view of the bait retrieval paths and includes a non-zero water current velocity and/or a non-zero drift velocity for mobile structure 101, which begins the simulations at origin 1520 and drifts along drift line 1524. Graph 1500 also includes underwater target 1408 at a position 15 meters east from the starting position of mobile structure 101. Surface 205c represents the water surface of the underlying water column. Also shown are casting simulations 1510, including the recommended casting simulation 1514 with a cast range of 26.1 m to cast position 1522.

FIG. 16 shows graph 1600 of the three dimensional bait retrieval path corresponding to a recommended casting simulation 1614 using synthetic bait 1300A and modeled using an embodiment of process 900 and the parameters set forth above. As shown in FIG. 16, graph 1600 is a perspective view of bait retrieval path 1614 and includes a non-zero water current velocity and/or a non-zero drift velocity for mobile structure 101, which begins the simulation at origin 1620 and drifts along drift line 1624. Graph 1600 also includes underwater target 1408 at a position approximately 8 meters east and 15 meters south from the starting position of mobile structure 101. Plane 205 represents the waterline at water surface 205c and above water column 205a. Also shown is cast position 1622 corresponding to recommended casting simulation 1614.

Figure 17:
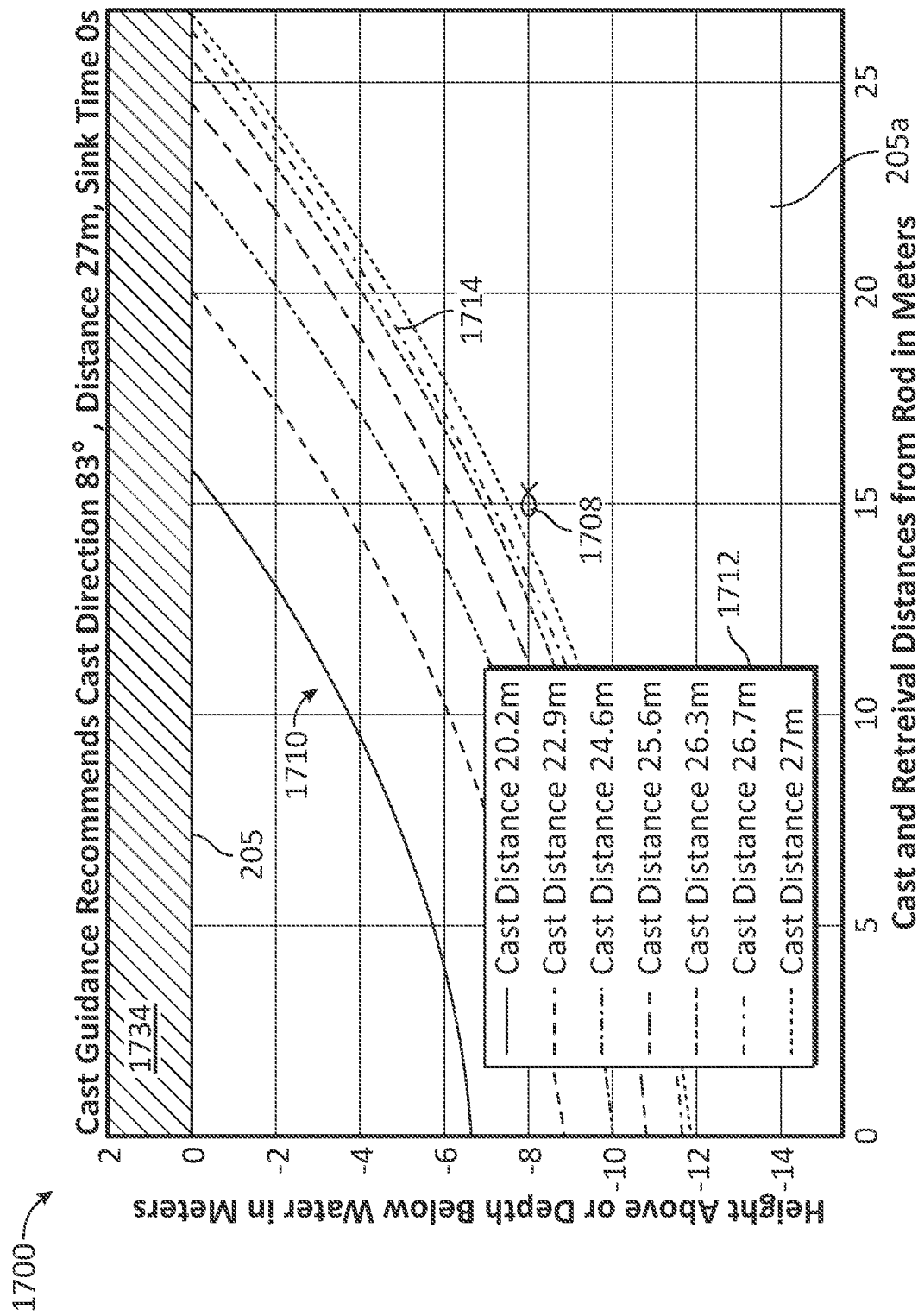
FIGS. 17-19 illustrate graphs of modeled casts, of the synthetic bait of FIG. 13B, used to provide casting guidance in accordance with embodiments of the disclosure.
Figure 18:
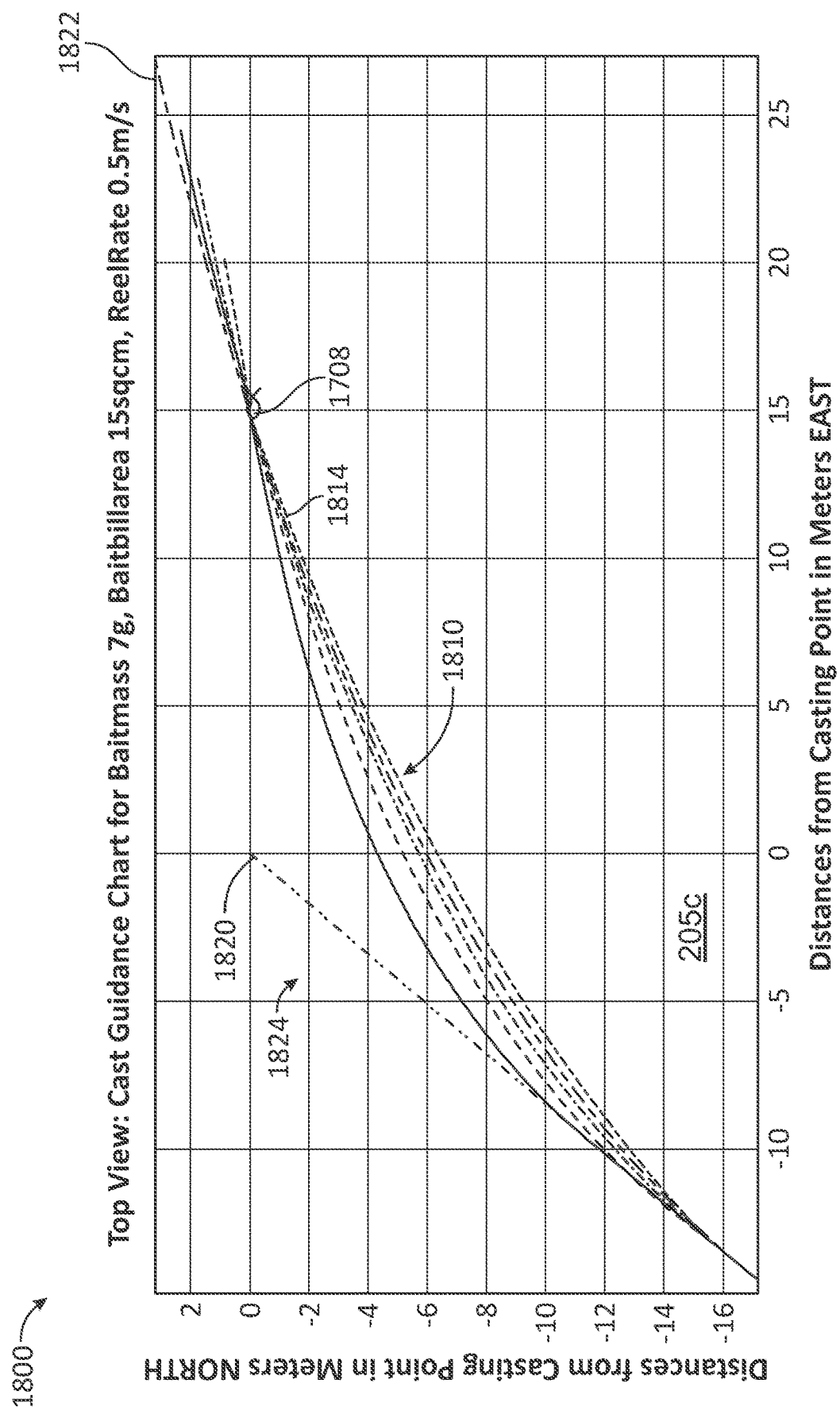
Figure 19:
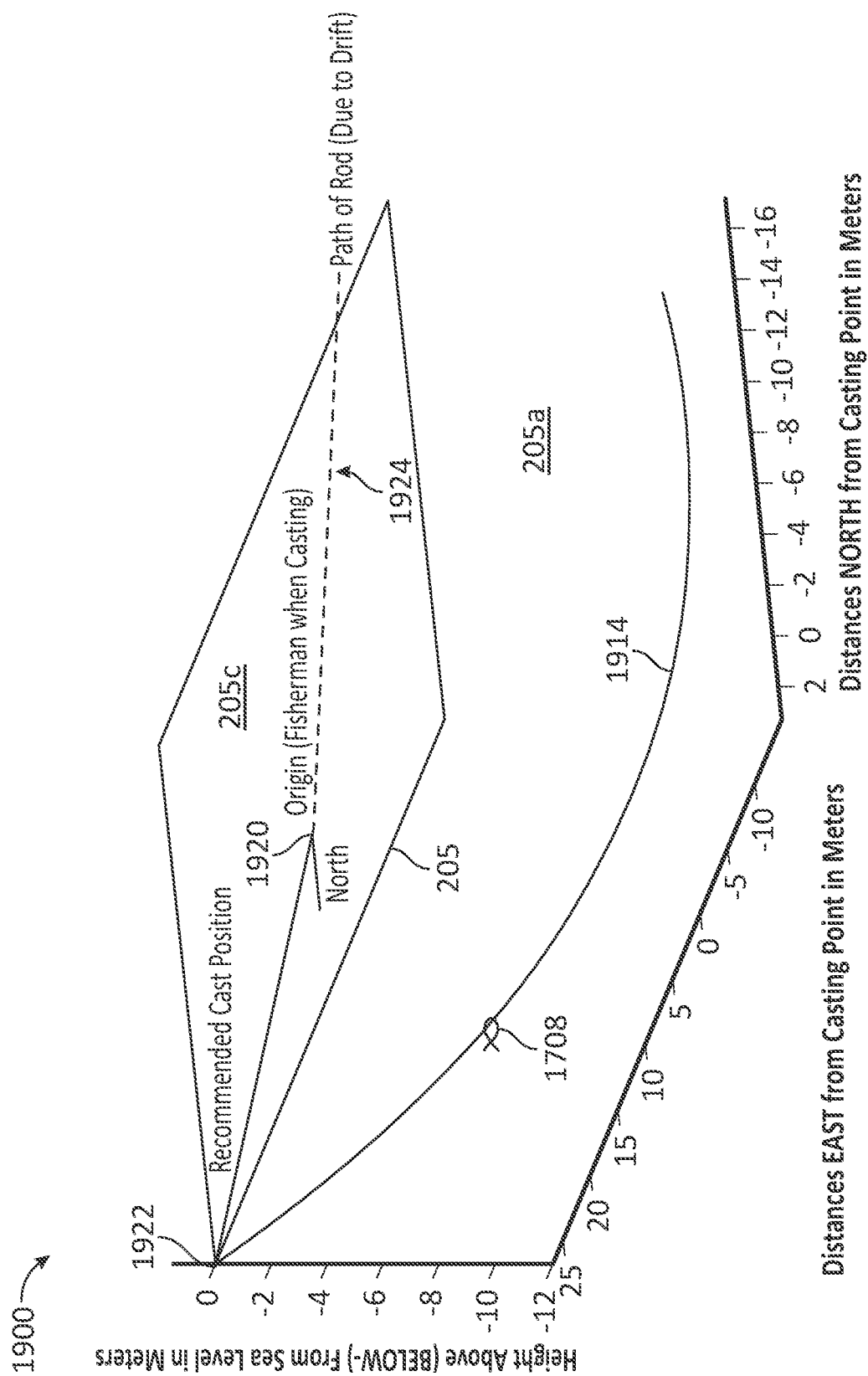

In another example, FIGS. 17-19 illustrate graphs of modeled casts, of synthetic bait 1300B of FIG. 13B, used to provide casting guidance in accordance with embodiments of the disclosure. In particular, parameters for synthetic bait 1300B used in process 900 may be the following: Bait.BillArea_cmsq=15; Bait.Mass_g=7; Bait.Mass_kg=Bait.Mass_g/1000; Bait.ACd=0.02^2*1.4; Bait.Cl=0.5; Setup.FishPos_m=[150−8]; Setup.BoatDrift_Kts=1; Setup.BoatSet_Deg=210; Setup.Current_Kts=0.5; Setup.Current_Deg=240; Setup.RodHeight_m=1.5 (with this type of lure, the rod tip is often raised and lowered to provide action on the bait, but 1.5 m, or just above the waist, is the average rod height); Setup.MinimumDropProximity_m=1 (e.g., can fall closer to the target than synthetic bait 1300A as the vertical drop can become a good strike point); Cast.ReelRate_m_per_sec=0.5 (e.g., soft baits are typically retrieved at a slower rate than a crank bait). As noted herein, any of such casting guidance parameters and/or suggested operating techniques may be conveyed to a user through a casting guidance indicator, as described herein.

FIG. 17 shows graph 1700 of bait retrieval path as a function of cast range (e.g., as set forth in legend 1712), using synthetic bait 1300B and modeled using an embodiment of process 900 and the parameters set forth above. As shown in FIG. 17, graph 1700 includes underwater target 1708 at a depth of 8 meters and range of 15 meters from the starting position of mobile structure 101, which is at the origin of graph 1700. Line 205 represents the waterline between above-the-water portion 1734 and water column 205a. Also shown are casting simulations 1710, including the recommended casting simulation 1714 with a cast range of 27 m, cast bearing of 83 degrees, and a sink time of 0 s.

FIG. 18 shows graph 1800 of bait retrieval path as a function of cast range (e.g., as set forth in legend 1712), using synthetic bait 1300B and modeled using an embodiment of process 900 and the parameters set forth above. As shown in FIG. 18, graph 1800 is a top view of the bait retrieval paths and includes a non-zero water current velocity and/or a non-zero drift velocity for mobile structure 101, which begins the simulations at origin 1820 and drifts along drift line 1824. Graph 1800 also includes underwater target 1708 at a position 15 meters east from the starting position of mobile structure 101. Surface 205c represents the water surface of the underlying water column. Also shown are casting simulations 1810, including the recommended casting simulation 1814 with a cast range of 27 m to cast position 1822.

FIG. 19 shows graph 1900 of the three dimensional bait retrieval path corresponding to a recommended casting simulation 1914 using synthetic bait 1300B and modeled using an embodiment of process 900 and the parameters set forth above. As shown in FIG. 19, graph 1900 is a perspective view of bait retrieval path 1914 and includes a non-zero water current velocity and/or a non-zero drift velocity for mobile structure 101, which begins the simulation at origin 1920 and drifts along drift line 1924. Graph 1900 also includes underwater target 1708 at a position approximately 10 meters east and 3 meters north from the starting position of mobile structure 101. Plane 205 represents the waterline at water surface 205c and above water column 205a. Also shown is cast position 1922 corresponding to recommended casting simulation 1914.

Figure 20:
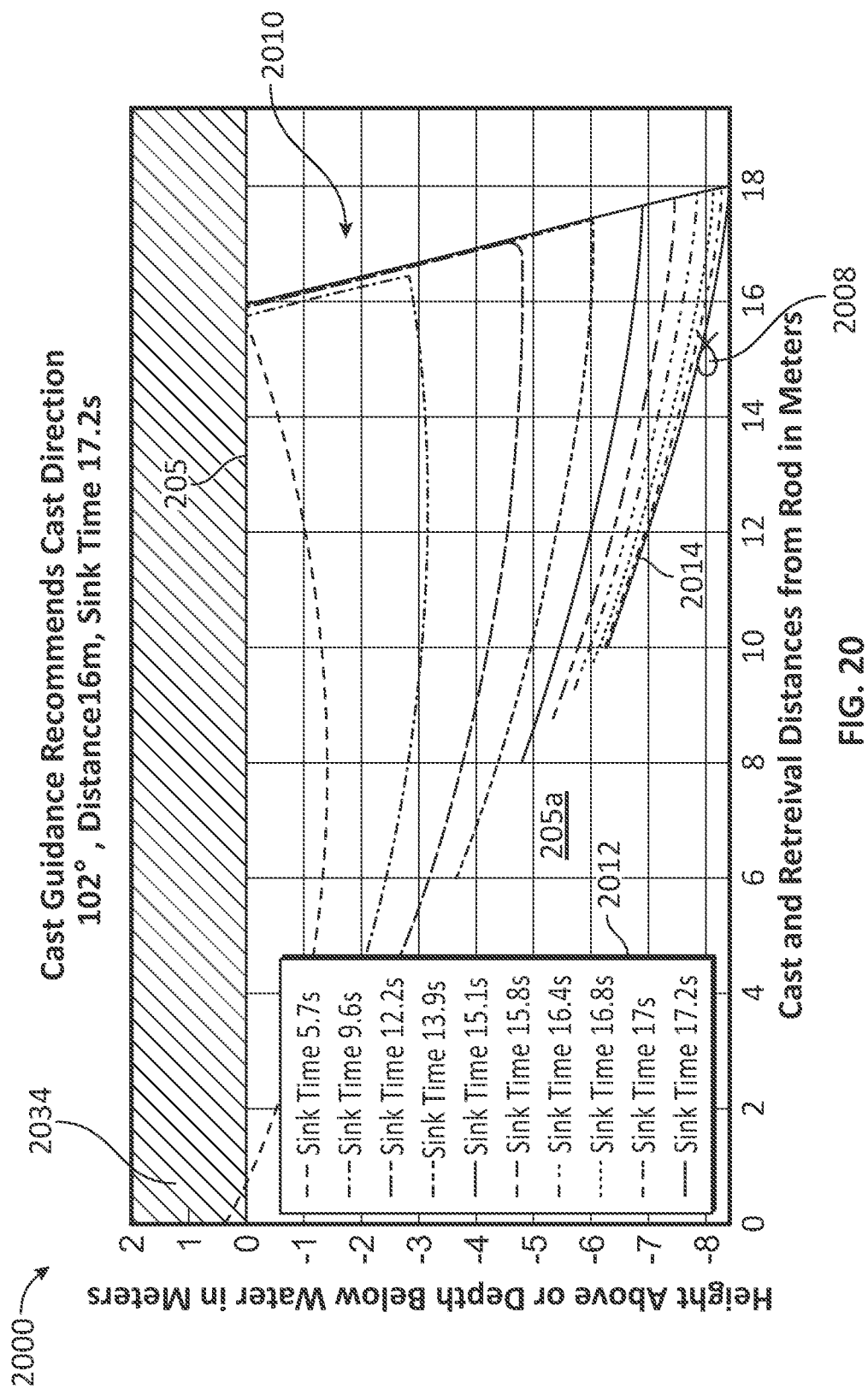
FIGS. 20-22 illustrate graphs of modeled casts, of the synthetic bait of FIG. 13B, used to provide casting guidance in accordance with embodiments of the disclosure.
Figure 21:
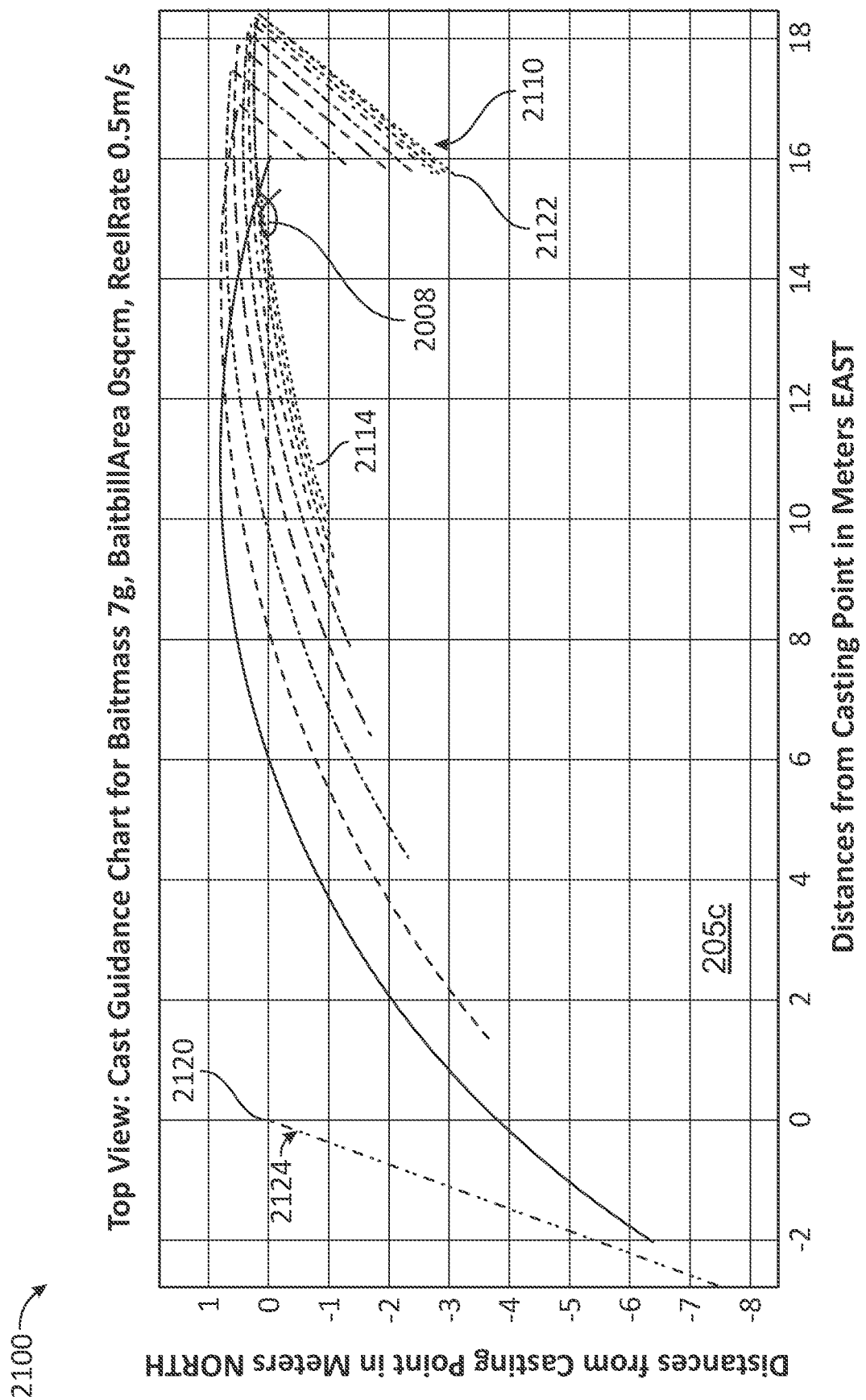
Figure 22:
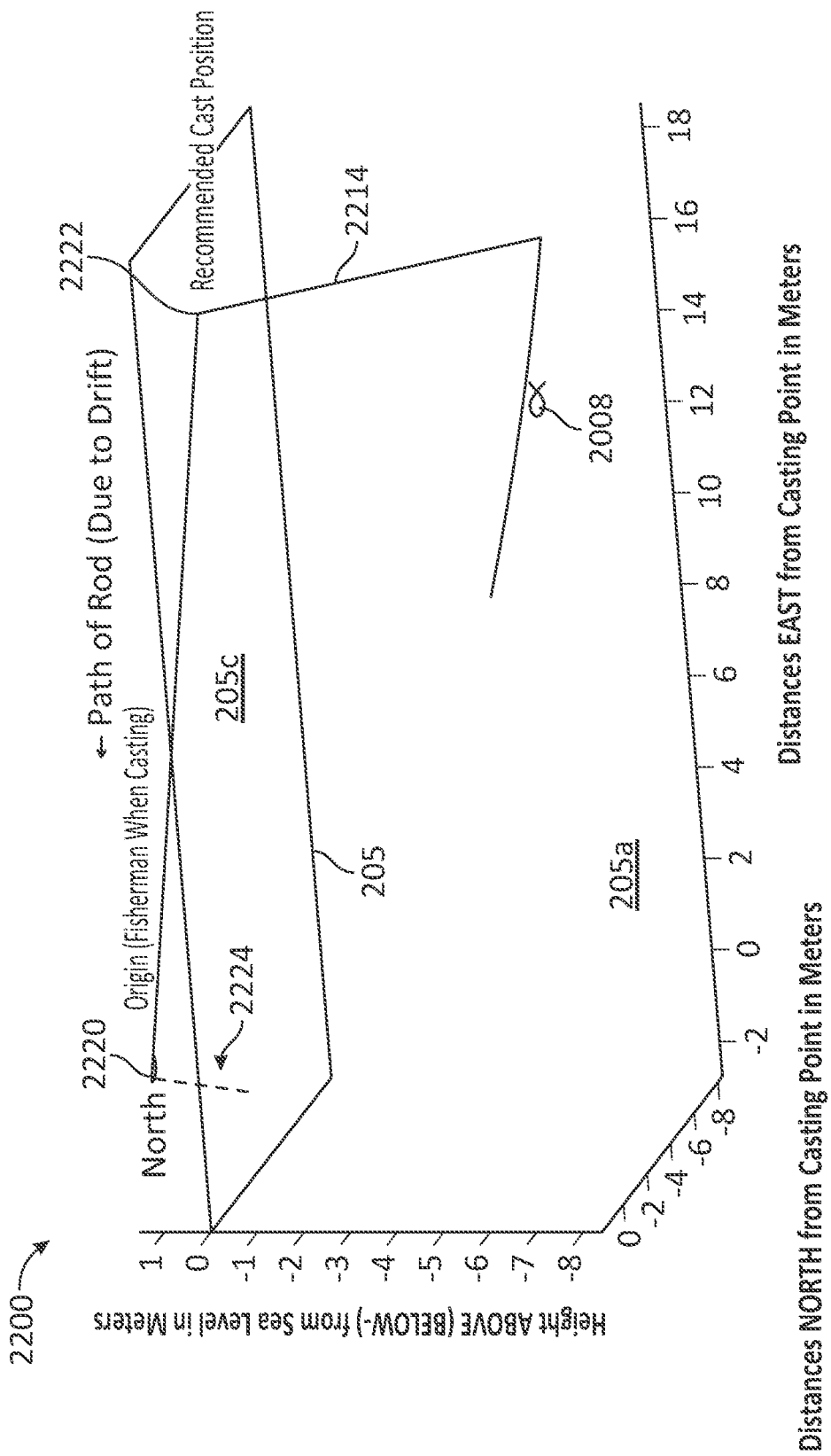

In another example, FIGS. 20-22 illustrate graphs of modeled casts, of synthetic bait 1300B of FIG. 13B, used to provide casting guidance in accordance with embodiments of the disclosure. In particular, parameters for synthetic bait 1300B used in process 900 may be the same as those used with respect to FIGS. 17-19, but with Bait.BillArea_cmsq=0, such that the cast range is not varied between iterations, as described herein. As noted herein, any of such casting guidance parameters and/or suggested operating techniques may be conveyed to a user through a casting guidance indicator, as described herein.

FIG. 20 shows graph 2000 of bait retrieval path as a function of cast range (e.g., as set forth in legend 2012), using synthetic bait 1300B and modeled using an embodiment of process 900 and the parameters set forth above. As shown in FIG. 20, graph 2000 includes underwater target 2008 at a depth of 8 meters and range of 15 meters from the starting position of mobile structure 101, which is at the origin of graph 2000. Line 205 represents the waterline between above-the-water portion 2034 and water column 205a. Also shown are casting simulations 2010, including the recommended casting simulation 2014 with a cast range of 16 m, cast bearing of 102 degrees, and a sink time of 17.2 s.

FIG. 21 shows graph 2100 of bait retrieval path as a function of cast range (e.g., as set forth in legend 2012), using synthetic bait 1300B and modeled using an embodiment of process 900 and the parameters set forth above. As shown in FIG. 21, graph 2100 is a top view of the bait retrieval paths and includes a non-zero water current velocity and/or a non-zero drift velocity for mobile structure 101, which begins the simulations at origin 2120 and drifts along drift line 2124. Graph 2100 also includes underwater target 2008 at a position 15 meters east from the starting position of mobile structure 101. Surface 205c represents the water surface of the underlying water column. Also shown are casting simulations 2110, including the recommended casting simulation 2114 with a cast range of 16 m to cast position 2122.

FIG. 22 shows graph 2200 of the three dimensional bait retrieval path corresponding to a recommended casting simulation 2214 using synthetic bait 1300B and modeled using an embodiment of process 900 and the parameters set forth above. As shown in FIG. 22, graph 2200 is a perspective view of bait retrieval path 2214 and includes a non-zero water current velocity and/or a non-zero drift velocity for mobile structure 101, which begins the simulation at origin 2220 and drifts along drift line 2224. Graph 2200 also includes underwater target 2008 at a position approximately 12 meters east and 8 meters south from the starting position of mobile structure 101. Plane 205 represents the waterline at water surface 205c and above water column 205a. Also shown is cast position 2222 corresponding to recommended casting simulation 2214.

Figure 23:
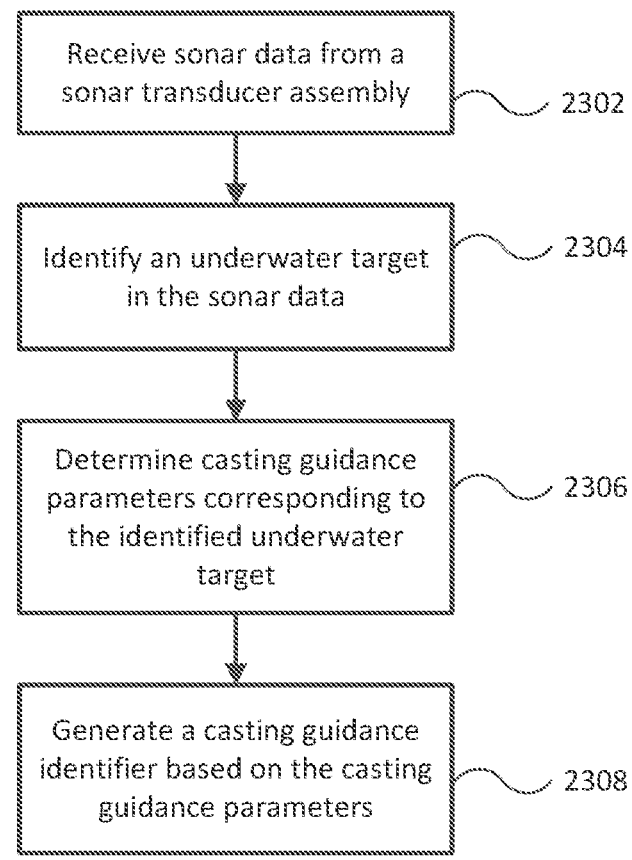
FIG. 23 illustrates a flow diagram of various operations to provide casting guidance in accordance with an embodiment of the disclosure.

FIG. 23 illustrates a flow diagram of process 2300 to provide casting guidance in accordance with embodiments of the disclosure. In some embodiments, the operations of FIG. 23 may be implemented as software instructions executed by one or more logic devices associated with corresponding electronic devices, sensors, and/or structures depicted in FIGS. 1A through 4. More generally, the operations of FIG. 23 may be implemented with any combination of software instructions and/or electronic hardware (e.g., inductors, capacitors, amplifiers, actuators, or other analog and/or digital components).

It should be appreciated that any step, sub-step, sub-process, or block of process 2300 may be performed in an order or arrangement different from the embodiments illustrated by FIG. 23. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 2300 is described with reference to systems described in reference to FIGS. 1A-4 and display views described in reference to FIGS. 6-8, process 2300 may be performed by other systems different from those systems and including a different selection of electronic devices, sensors, assemblies, mobile structures, and/or mobile structure attributes, in addition to different display views and/or display technologies.

Process 2300 represents a method for providing augmented reality casting guidance using systems 100, 100B, 220, and/or 420 in accordance with embodiments of the disclosure. At the initiation of process 2300, various system parameters may be populated by prior execution of a process similar to process 2300, for example, or may be initialized to zero and/or one or more values corresponding to typical, stored, and/or learned values derived from past operation of process 2300, as described herein.

In block 2302, a logic device receives sonar data from a sonar transducer assembly. For example, controller 130 of systems 100 or 100B and/or controller 221 of portable imaging device 220 may be configured to receive sonar data from sonar transducer assembly 112 of sonar system 110. In some embodiments the controller may be configured to transmit position and/or orientation data corresponding to portion 330 of the field of view of display 226 that extends below waterline 205b to sonar system 110 to aim transducer assembly 112 at portion 330 (e.g., or to sweep transducer assembly 112 through portion 330) to acquire substantially real time sonar data corresponding to portion 330. In other embodiments, the controller may be configured to transmit such position and/or orientation data to receive sonar data limited to portion 330, such as from prior-acquired sonar data and/or from a survey map limited by partitioning the sonar data according to corresponding position and/or orientation data, which may be provided by an SPOS when the sonar data was acquired. In various embodiments, such sonar data may include one or more sonar returns and/or sonar return profiles corresponding to one or more underwater objects or features, including fish, thermoclines, abrupt changes in depth (e.g., of a sea floor, or due to a submerged object), and/or other underwater targets.

Upon receipt of such sonar data, controller 130 of systems 100 or 100B and/or controller 221 of portable imaging device 220 may be configured to render sonar data acquired in block 2302 in a display (of user interface 120) for view by a user. For example, such sonar data may be rendered in portion 330 of the FOV of display 226, or in portion 430 of the FOV of displays 426. In various embodiments, the controller may be configured to apply various types of image processing to the sonar data when rendering this sonar data for display to a user, as described herein.

In block 2304, a logic device identifies an underwater target in sonar data. For example, controller 130 of systems 100 or 100B and/or controller 221 of portable imaging device 220 may be configured to identify one or more underwater targets in the sonar data received in block 2302. In some embodiments, the controller may be configured to detect sonar return profiles in the sonar data received in block 2302 corresponding to one or more fish 208, abrupt changes in depth of sea floor 206, thermoclines, and/or other water column features in the sonar data and identify the detected one or more underwater targets by their absolute and/or relative position (e.g., relative to a position and/or heading of mobile structure 101), the type of detected underwater target, and/or by other target characteristics. In embodiments where the sonar data is rendered for display to a user, the controller may be configured to receive user input (e.g., such as at a touch screen display, or through use of a selection device such as a mouse, joystick, or button(s)) selecting one or more water column features within the rendered sonar data and identify the selected one or more underwater targets by absolute and/or relative position. For example, such selection may be performed according to any of the systems and methods described within U.S. Provisional Patent Application No. 62/451,427 filed Jan. 27, 2017 and entitled "THREE DIMENSIONAL TARGET SELECTION SYSTEMS AND METHODS," which is incorporated herein by reference in its entirety.

In block 2306, a logic device determines casting guidance parameters corresponding to an underwater target. For example, controller 130 of systems 100 or 100B and/or controller 221 of portable imaging device 220 may be configured to determine one or more casting guidance parameters, such as a cast bearing or heading, a cast range, a cast position (absolute or relative), a sink time, a retrieval rate, and/or other casting guidance parameters corresponding to one or more underwater targets identified in block 2304. In various embodiments, the controller may be configured to receive one or more casting mechanism characteristics and/or bait characteristics (e.g., retrieval time, tension, line weight, line buoyancy, bait weight, bait nose area, bait drag or lift coefficient, and/or other characteristics) and determine one or more casting guidance parameters based, at least in part, on the one or more casting mechanism characteristics and/or bait characteristics In some embodiments, the controller may be configured to receive sensor data corresponding to a state of mobile structure 101 or one or more components of mobile structure 101 (e.g., state data), for example, and/or environment data associated with mobile structure 101 or one or more components of mobile structure 101, and to determine the casting guidance parameters based, at least in part, on such state and/or environmental data. For example, the controller may be configured to receive one or more water temperatures, water current directions, speeds, and/or velocities, casting mechanism characteristics, bait characteristics, underwater target characteristics, positions, headings, water speeds, and/or velocities corresponding to mobile structure 101, absolute and/or relative wind speeds (e.g., relative to motion of mobile structure 101), and/or other state or environmental data, including one or more control parameters (e.g., model according to constant tension, constant retrieval rate, minimum bait proximity, minimum and/or maximum bait velocity, and/or other control parameters).

In some embodiments, the controller may be configured to determine the casting guidance parameters by, at least in part, selecting a search space comprising a set of cast bearings or headings, cast ranges, cast positions, and/or sink times, determining a set of bait retrieval paths corresponding to the selected search space, and selecting one or more cast bearings or headings, cast ranges, cast positions, and/or sink times corresponding to the one or more bait retrieval paths of the set of bait retrieval paths passing closest to the one or more identified underwater targets. In other embodiments, the controller may be configured to determine the casting guidance parameters by, at least in part, initializing a bait retrieval path simulation by placing a simulated bait at an initial bait position a cast range away from the mobile structure along a cast bearing or heading, determining at least a line tension and a water effect force acting on the simulated bait, and determining a bait retrieval path by iteratively updating the initial bait position based, at least in part, on the determined line tension and water effect force. In related embodiments, the controller may be configured to include bait weight and/or buoyancy forces when determining a bait retrieval path by iteratively updating the initial bait position, as described herein.

In block 2308, a logic device generates a casting guidance identifier based on casting guidance parameters. For example, controller 130 of systems 100 or 100B and/or controller 221 of portable imaging device 220 may be configured to generate one or more casting guidance identifiers based, at least in part, on the casting guidance parameters determined in block 2306.

In some embodiments, the controller may be configured to render casting guidance identifiers on a surface of the body of water as rendered in an FOV of a display of user interface 120, 220, and/or 420. The controller may also be configured to render image data provided by a portable imaging device in a portion of the FOV of the display that extends above a waterline of the body of water in the FOV of the display. In embodiments where the portable imaging device includes a visible spectrum imaging module and an infrared imaging module, the controller may be configured to generate combined image data from visible spectrum image data and infrared image data provided by the portable imaging device and render the combined image data in the portion of the FOV of the display that extends above the waterline of the body of water. In related embodiments, the controller may be configured to render at least a subset of the received sonar data including the identified one or more underwater targets in a portion of the FOV of the display that extends below a waterline of the body of water in the FOV of the display.

In embodiments where the sonar transducer assembly includes an array of sonar transducer elements (e.g., such as in a 3d sonar or beamforming sonar assembly), a sonar position and/or orientation sensor (SPOS), and/or a sonar actuator configured to adjust a position and/or orientation of the sonar transducer assembly, the controller may be configured to ensonify at least a subset of the portion of the FOV that extends below the waterline using the array of sonar transducer elements (e.g., through beamforming), the SPOS, and/or the sonar actuator.

In additional embodiments, where the portable imaging device includes a display and an imager position and/or orientation sensor (IPOS), and where the portable imaging device is adapted to be held or worn by a user of the system while the user views the display, the controller may be configured to determine a waterline of the body of water relative to an FOV of the display, using image data, position data, and/or orientation data provided by the portable imaging device and/or the IPOS, and to render at least a subset of the received sonar data including the identified one or more underwater targets in a portion of the FOV of the display that extends below the waterline in the FOV of the display.

In another embodiment, where the system includes an actuated active illumination device and/or an audio subsystem, the controller may be configure to project the at least one casting guidance identifier on a surface of the body of water using the actuated active illumination device to indicate a cast position to a user of the system and/or to communicate the at least one casting guidance identifier using the audio sub-system to indicate a cast range and/or a cast bearing or heading to the user of the system, as described herein.

In further embodiments, image data, position data, orientation data, sonar data, and/or casting guidance parameters acquired and/or processed in blocks 2302-2308 may be used to control operation of mobile structure 101, such as by controlling steering sensor/actuator 150 and/or propulsion system 170 to steer mobile structure 101 according to desired casting parameters, for example, and/or according to positions and/or depths of one or more underwater targets and/or water column features (e.g., including various types of underwater features), as described herein.

It is contemplated that any one or combination of methods to provide casting guidance may be performed according to one or more operating contexts of a control loop, for example, such as a startup, learning, running, and/or other type operating context. For example, process 2300 may proceed back to block 2302 and proceed through process 2300 again to produce updated or alternative or converging casting guidance, as in a control loop.

Embodiments of the present disclosure can thus provide casting guidance. Such embodiments may be used to provide casting guidance to a user of a mobile structure, such as a watercraft, to assist in capture of fish, for example, and/or to assist in the operation of other systems, devices, and/or sensors coupled to the mobile structure, such as automated and/or actuated bait casting and retrieval devices.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a sonar transducer assembly adapted to be mounted to a mobile structure and placed in a body of water; and
   a logic device configured to communicate with the sonar transducer assembly, wherein the logic device is configured to:
   identify one or more underwater targets in sonar data received from the sonar transducer assembly;
   determine casting guidance parameters corresponding to the one or more identified underwater targets; and
   generate at least one casting guidance identifier based, at least in part, on the determined casting guidance parameters.

2. The system of claim 1, wherein the identifying the one or more underwater targets in the received sonar data comprises:
   detecting one or more water column features in the received sonar data;
   determining one or more absolute or relative positions corresponding to the one or more water column features detected in the received sonar data; and
   identifying the one or more underwater targets as the one or more absolute or relative positions corresponding to the one or more water column features detected in the received sonar data.

3. The system of claim 1, further comprising a user interface comprising a display, wherein the identifying the one or more underwater targets in the received sonar data comprises:
   rendering at least a portion of the received sonar data on the display;
   determining one or more absolute or relative positions within the rendered portion of the received sonar data based, at least in part, on user input received by the user interface; and
   identifying the one or more underwater targets as the one or more absolute or relative positions corresponding to the user input received by the user interface.

4. The system of claim 1, wherein the determining the casting guidance parameters comprises:
   selecting a search space comprising a set of cast bearings or headings, cast ranges, cast positions, and/or sink times;
   determining a set of bait retrieval paths corresponding to the selected search space; and
   selecting one or more cast bearings or headings, cast ranges, cast positions, and/or sink times corresponding to the one or more bait retrieval paths of the set of bait retrieval paths passing closest to the one or more identified underwater targets.

5. The system of claim 1, wherein the determining the casting guidance parameters comprises:
   initializing a bait retrieval path simulation by placing a simulated bait at an initial bait position a cast range away from the mobile structure along a cast bearing or heading;
   determining at least a line tension and a water effect force acting on the simulated bait; and
   determining a bait retrieval path by iteratively updating the initial bait position based, at least in part, on the determined line tension and water effect force.

6. The system of claim 1, further comprising a user interface comprising a display, wherein the generating the at least one casting guidance identifier comprises:
   rendering the at least one casting guidance identifier on a surface of the body of water in a field of view (FOV) of the display.

7. The system of claim 6, wherein the user interface comprises a portable imaging device, and wherein the logic device is configured to:
   render image data provided by the portable imaging device in a portion of the FOV of the display that extends above a waterline of the body of water in the FOV of the display.

8. The system of claim 7, wherein the portable imaging device comprises a visible spectrum imaging module and an infrared imaging module, and wherein the logic device is configured to:
   generate combined image data from visible spectrum image data and infrared image data provided by the portable imaging device; and
   render the combined image data in the portion of the FOV of the display that extends above the waterline of the body of water.

9. The system of claim 6, wherein the logic device is configured to:
   render at least a subset of the received sonar data including the identified one or more underwater targets in a portion of the FOV of the display that extends below a waterline of the body of water in the FOV of the display; and wherein:

the mobile structure comprises a watercraft;

the sonar transducer assembly comprises an array of sonar transducer elements, a sonar position and/or orientation sensor (SPOS), and/or a sonar actuator configured to adjust a position and/or orientation of the sonar transducer assembly; and the logic device is configured to ensonify at least a subset of the portion of the FOV that extends below the waterline using the array of sonar transducer elements, the SPOS, and/or the sonar actuator.

10. The system of claim 1, further comprising a portable imaging device comprising a display and an imager position and/or orientation sensor (IPOS), wherein the portable imaging device is adapted to be held or worn by a user of the system while the user views the display, and wherein the logic device is configured to:

determine a waterline of the body of water relative to a field of view (FOV) of the display, using image data, position data, and/or orientation data provided by the portable imaging device and/or the IPOS; and render at least a subset of the received sonar data including the identified one or more underwater targets in a portion of the FOV of the display that extends below the waterline in the FOV of the display.

11. The system of claim 1, further comprising an actuated active illumination device and/or an audio sub-system, wherein the generating the at least one casting guidance identifier comprises:

projecting the at least one casting guidance identifier on a surface of the body of water using the actuated active illumination device to indicate a cast position to a user of the system; and/or communicating the at least one casting guidance identifier using the audio sub-system to indicate a cast range and/or a cast bearing or heading to the user of the system.

12. A method comprising:

identifying one or more underwater targets in sonar data received from a sonar transducer assembly adapted to be mounted to a mobile structure and placed in the body of water;

determining casting guidance parameters corresponding to the one or more identified underwater targets; and generating at least one casting guidance identifier based, at least in part, on the determined casting guidance parameters.

13. The method of claim 12, wherein the identifying the one or more underwater targets in the received sonar data comprises:

detecting one or more water column features in the received sonar data;

determining one or more absolute or relative positions corresponding to the one or more water column features detected in the received sonar data; and identifying the one or more underwater targets as the one or more absolute or relative positions corresponding to the one or more water column features detected in the received sonar data.

14. The method of claim 12, wherein the identifying the one or more underwater targets in the received sonar data comprises:

rendering at least a portion of the received sonar data on a display of a user interface;

determining one or more absolute or relative positions within the rendered portion of the received sonar data based, at least in part, on user input received by the user interface; and identifying the one or more underwater targets as the one or more absolute or relative positions corresponding to the user input received by the user interface.

15. The method of claim 12, wherein the determining the casting guidance parameters comprises:

selecting a search space comprising a set of cast bearings or headings, cast ranges, cast positions, and/or sink times;

determining a set of bait retrieval paths corresponding to the selected search space; and selecting one or more cast bearings or headings, cast ranges, cast positions, and/or sink times corresponding to the one or more bait retrieval paths of the set of bait retrieval paths passing closest to the one or more identified underwater targets.

16. The method of claim 12, wherein the determining the casting guidance parameters comprises:

initializing a bait retrieval path simulation by placing a simulated bait at an initial bait position a cast range away from the mobile structure along a cast bearing or heading;

determining at least a line tension and a water effect force acting on the simulated bait; and determining a bait retrieval path by iteratively updating the initial bait position based, at least in part, on the determined line tension and water effect force.

17. The method of claim 12, wherein the generating the at least one casting guidance identifier comprises:

rendering the at least one casting guidance identifier on a surface of the body of water in a field of view (FOV) of a display of a user interface;

wherein the user interface comprises a portable imaging device, the method further comprising:

rendering image data provided by the portable imaging device in a portion of the FOV of the display that extends above a waterline of the body of water in the FOV of the display; and wherein the portable imaging device comprises a visible spectrum imaging module and an infrared imaging module, the method further comprising:

generating combined image data from visible spectrum image data and infrared image data provided by the portable imaging device; and rendering the combined image data in the portion of the FOV of the display that extends above the waterline of the body of water.

18. The method of claim 17, further comprising:

rendering at least a subset of the received sonar data including the identified one or more underwater targets in a portion of the FOV of the display that extends below a waterline of the body of water in the FOV of the display; and wherein the sonar transducer assembly comprises an array of sonar transducer elements, a sonar position and/or orientation sensor (SPOS), and/or a sonar actuator configured to adjust a position and/or orientation of the sonar transducer assembly, the method further comprising:

ensonifying at least a subset of the portion of the FOV that extends below the waterline using the array of sonar transducer elements, the SPOS, and/or the sonar actuator.

19. The method of claim 12, further comprising:
determining a waterline of the body of water relative to a field of view (FOV) of a display of a portable imaging device, using image data, position data, and/or orientation data provided by the portable imaging device and/or an imager position and/or orientation sensor (IPOS) of the portable imaging device, wherein the portable imaging device is adapted to be held or worn by a user of the system while the user views the display; and
rendering at least a subset of the received sonar data including the identified one or more underwater targets in a portion of the FOV of the display that extends below the waterline in the FOV of the display.

20. The method of claim 12, wherein the generating the at least one casting guidance identifier comprises:
projecting the at least one casting guidance identifier on a surface of the body of water using an actuated active illumination device; and/or
communicating the at least one casting guidance identifier to a user of the system using an audio sub-system.

* * * * *